(12) United States Patent
Takashima et al.

(10) Patent No.: US 7,783,685 B2
(45) Date of Patent: Aug. 24, 2010

(54) INFORMATION RECORDING/REPRODUCING APPARATUS, INFORMATION RECORDING/REPRODUCING METHOD, PROGRAM STORAGE MEDIUM, AND PROGRAM

(75) Inventors: Yoshikazu Takashima, Tokyo (JP); Masanobu Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 805 days.

(21) Appl. No.: 10/988,166

(22) Filed: Nov. 12, 2004

(65) Prior Publication Data

US 2005/0108466 A1    May 19, 2005

(30) Foreign Application Priority Data

Nov. 13, 2003    (JP)    ............................ P2003-384094

(51) Int. Cl.
G06F 17/00    (2006.01)
G06F 13/28    (2006.01)
(52) U.S. Cl. .................... 707/828; 707/737; 707/750
(58) Field of Classification Search .................. None
See application file for complete search history.

(56) References Cited

U.S. PATENT DOCUMENTS 6,389,569 B1 *    5/2002    Chung et al. ................. 714/763
6,490,683 B1 *    12/2002    Yamada et al. ............... 713/176

(Continued)

FOREIGN PATENT DOCUMENTS

EP    0 758 124    2/1997
EP    1 271 526    1/2003

(Continued)

OTHER PUBLICATIONS

"Super Video CD SVCD System Specification" SVCD System Specification, XX, XX, Nov. 1998, pp. 1-86, XP001150484.

(Continued)

*Primary Examiner*—Khanh B Pham
*Assistant Examiner*—Azam Cheema
(74) *Attorney, Agent, or Firm*—Oblon, Spivak, McClelland, Maier & Neustadt, L.L.P.

(57) ABSTRACT

An information recording/reproducing apparatus is disclosed which includes: a recording section for recording files to a storage medium; an arranging section for arranging the files into groups by attribute so as to establish allocation of the files on the storage medium; and a controlling section for controlling the recording section so as to record the files to the storage medium based on the allocation established by the arranging section and to record concurrently allocation information reflecting the allocation to a predetermined location on the storage medium.

18 Claims, 39 Drawing Sheets

U.S. PATENT DOCUMENTS

| | | | |
|---|---|---|---|
| 6,658,527 B1* | 12/2003 | Hiroyasu | 711/112 |
| 6,664,459 B2* | 12/2003 | Lee et al. | 84/609 |
| 6,667,938 B2* | 12/2003 | Denda et al. | 369/53.18 |
| 6,775,803 B1* | 8/2004 | Chung et al. | 714/763 |
| 2001/0046373 A1* | 11/2001 | Ando et al. | 386/95 |
| 2003/0225758 A1* | 12/2003 | Yamasaki | 707/3 |
| 2004/0044829 A1* | 3/2004 | Dawson et al. | 711/4 |
| 2004/0107223 A1* | 6/2004 | Uno et al. | 707/200 |
| 2004/0114910 A1 | 6/2004 | Seo et al. | |
| 2004/0126094 A1* | 7/2004 | Kotani | 386/95 |
| 2004/0236728 A1* | 11/2004 | Newman et al. | 707/3 |
| 2005/0108466 A1* | 5/2005 | Takashima et al. | 711/100 |
| 2005/0254363 A1* | 11/2005 | Hamada et al. | 369/47.1 |
| 2006/0280075 A1* | 12/2006 | Kanegae et al. | 369/47.21 |

FOREIGN PATENT DOCUMENTS

| | | |
|---|---|---|
| JP | 1995-175592 | 7/1995 |
| JP | 2002-208233 | 7/2002 |
| JP | 2002-329385 | 11/2002 |
| JP | 2002-351724 | 12/2002 |
| JP | 2003-165837 * | 6/2003 |

OTHER PUBLICATIONS

Jim Taylor: "DVD demystified" 2001, McGraw-Hill, New York, XP002319697.

Yu C T et al: "Adaptive Record Clustering" ACM Transactions on Database Systems, Association for Computing Machinery. New York, US, vol. 10, No. 2, Jun. 1985, pp. 180-204, XP000718786 ISSN: 0362-5915.

* cited by examiner

FIG. 8

<Allocation Rule Set Table>

| [GROUPS] | [STARTING ADDRESSES] | [ENDING ADDRESSES] |
|---|---|---|
| Main G1 | $S_{MG1}$ | $E_{MG1}$ |
| Res G1 | $S_{RG1}$ | $E_{RG1}$ |
| Main G2 | $S_{MG2}$ | $E_{MG2}$ |
| Res G2 | $S_{RG2}$ | $E_{RG2}$ |
| G3 | $S_{G3}$ | $E_{G3}$ |
| G4 | $S_{G4}$ | $E_{G4}$ |

FIG. 9

| TYPICAL USER OPERATIONS | MIA | G1 | G2 | G3 | G4 | AV-STREAM | NONSPECIFIC APPLICATION FILE |
|---|---|---|---|---|---|---|---|
| [OPERATIONS OF SPECIFIC APPLICATIONS] | | | | | | | |
| CREATING A PLAY LIST | ○ | ○ | ○ | — | — | ○ | — |
| DIVIDING A PLAY LIST | ○ | ○ | — | — | — | — | — |
| COMBINING PLAY LISTS | ○ | ○ | — | — | — | — | — |
| ERASING AN ENTIRE PLAY LIST | ○ | ○ | — | — | — | — | — |
| ERASING A PLAY LIST IN PART | ○ | ○ | — | — | — | — | — |
| EDITING A VIRTUAL PLAY LIST WITHOUT USING BRIDGES | ○ | ○ | — | — | — | — | — |
| EDITING A VIRTUAL PLAY LIST USING BRIDGES | ○ | ○ | ○ | — | — | ○ | — |
| ERASING A VIRTUAL PLAY LIST | ○ | ○ | — | — | — | — | — |
| SETTING POST-RECORDING OF AUDIO DATA | ○ | ○ | — | ○ | — | — | — |
| CHANGING PLAY LIST DISPLAY ORDER | ○ | ○ | — | — | — | — | — |
| ADDING A MENU THUMBNAIL | ○ | — | — | — | ○ | — | — |
| ADDING A MARK THUMBNAIL | ○ | — | — | — | — | — | — |
| [OPERATIONS OTHER THAN THOSE OF SPECIFIC APPLICATIONS] | | | | | | | |
| ADDING A FILE INCOMPATIBLE WITH BDAV STANDARD (JPEG PICTURES, ETC.) | ○ | — | — | — | — | — | ○ |
| DELETING A FILE INCOMPATIBLE WITH BDAV STANDARD | ○ | — | — | — | — | — | — |

FIG. 10

| LSN | Structure | Descriptors | LBN |
|---|---|---|---|
| 0~15 | — | Reserved | |
| 16~18 | Volume Recognition Sequence | Reserved | |
| 19~31 | — | Reserved | |
| 32 | Main Volume Descriptor Sequence | Primary Volume Descriptor | |
| 33 | | Implementation Use Volume Descriptor | |
| 34 | | Partition Descriptor | |
| 35 | | Logical Volume Descriptor | |
| 36 | | Unallocated Space Descriptor | |
| 37 | | Terminating Descriptor | |
| 38~47 | | Trailing Logical Sectors | |
| 48 | Logical Volume Integrity Sequence | Logical Volume Integrity Descriptor | |
| 49 | | Terminating Descriptor | |
| 50~63 | | Trailing Logical Sectors | |
| 64~255 | — | Reserved | |
| 256 | Anchor-1 | Anchor Volume Descriptor Pointer | |
| 257~271 | — | Reserved | |
| 272~LSNall-272 | Partition | File Structure and Files | 0~LBNall |
| LSNall-271~LSNall-257 | — | Reserved | |
| LSNall-256 | Anchor-2 | Anchor Volume Descriptor Pointer | |
| LSNall-255~LSNall-224 | — | Reserved | |
| LSNall-223~LSNall-208 | Reserved Volume Descriptor Sequence | (SAME AS Main Volume Descriptor Sequence) | |
| LSNall-207~LSNall-1 | — | Reserved | |
| LSNall | Anchor-3 | Anchor Volume Descriptor Pointer | |

F I G. 11

| LBN | Structure | Descriptors | |
|---|---|---|---|
| 0~A | Space Bitmap | Space Bitmap Descriptor | |
| A+1 | File Set Descriptor Sequence | File Set Descriptor | ⑪ |
| A+2 | | Terminating Descriptor | |
| A+3 | ICB for Root Directory | FE(Root Directory) | ⑫ |
| A+4 | Root Directory | FID(parent directory) | ⑬ |
| | | FID(BDMV) | |
| | | FID(Resource) | |
| | | FID(DATA1) | |
| | | FID(DATA2) | |
| A+5 | ICB for BDMV Directory | FE(BDMV) | ⑭ |
| A+6 | ICB for Resource Directory | FE(Resource) | |
| A+7 | ICB for DATA1 Directory | FE(DATA1) | |
| A+8 | ICB for DATA2 Directory | FE(DATA2) | |
| A+9 | BDMV Directory | FID(parent directory) | |
| | | FID(Unit_Key_Gen_Value.inf) | ⑮ |
| | | FID(CPS_CCI..inf) | |
| | | : | |
| | | FID(STREAM) | |
| A+10 | ICBs for files/directories under BDMV Directory | FE(Unit_Key_Gen_Value.inf) | ⑯ |
| A+11 | | FID(CPS_CCI..inf) | |
| : | | : | |
| A+6 | | FE(STREAM) | ⑰ → TO LOCATION WHERE FILE DATA ARE STORED |

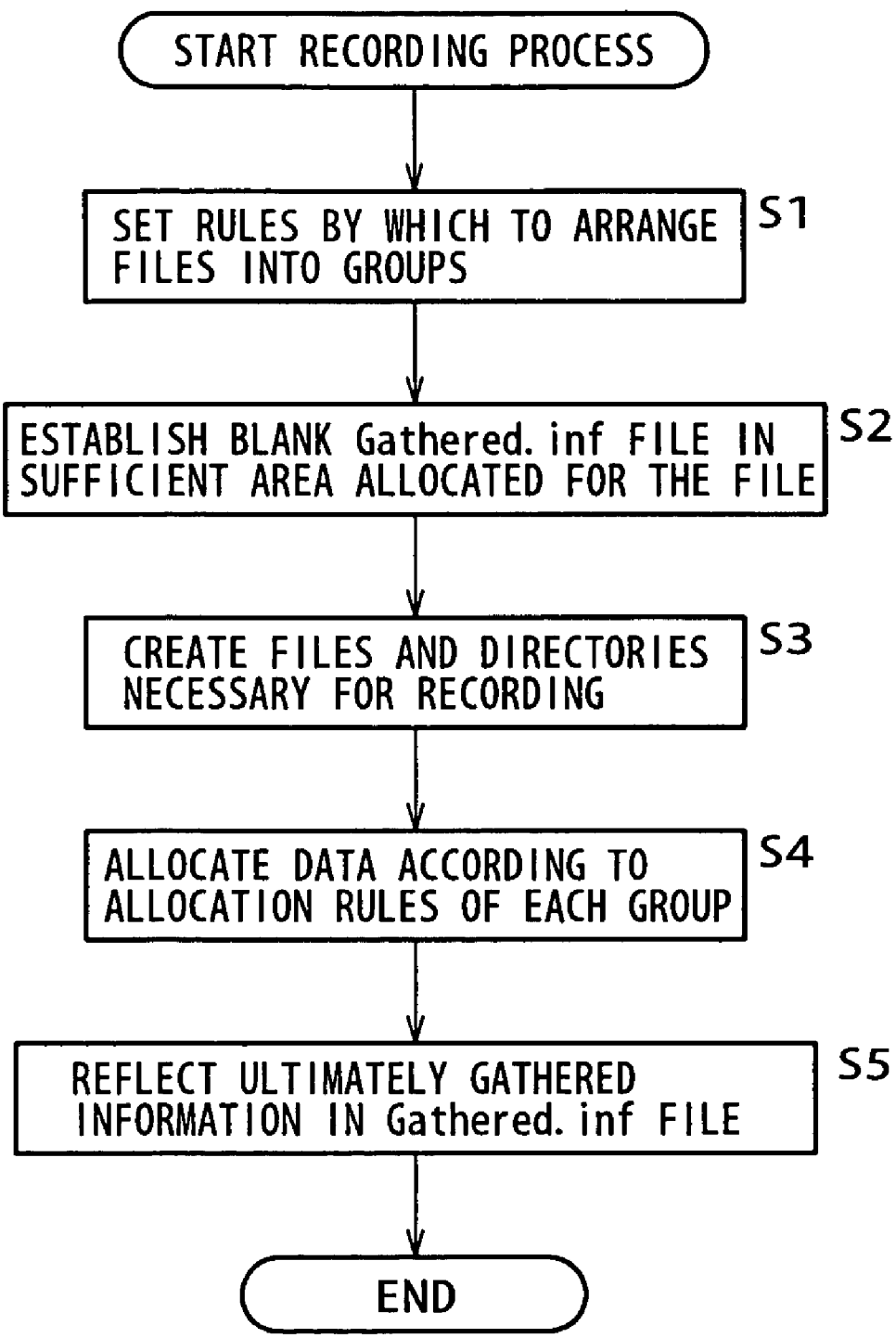

FIG. 15

<Gathered INFORMATION>

| [GROUPS] | [STARTING ADDRESSES] | [ENDING ADDRESSES] |
|---|---|---|
| G-Structure | $S_{st}$ | $E_{st}$ |
| Main G-A | $S_{MGA}$ | $E_{MGA}$ |
| Res G-A | $S_{RGA}$ | $E_{RGA}$ |
| Main G-B | $S_{MGB}$ | $E_{MGB}$ |
| Res G-B | $S_{RGB}$ | $E_{RGB}$ |
| G-C | $S_{GC}$ | $E_{GC}$ |
| G-X | $S_{GX}$ | $E_{GX}$ |

F I G. 3 5

| LBN | Structure | Descriptors |
|---|---|---|
| A | BDMV Directory | FID (parent directory) |
| | | FID (Unit_Key_Gen_Value.inf) |
| | | FID (CPS_CCI.inf) |
| | | : |
| | | FID (PLAYLIST) |
| | | FID (CLIPINF) |
| | | : |
| | | FID (STREAM) |
| A+1 | ICBs for files/directories under BDMV Directory | FE (Unit_Key_Gen_Value.inf) |
| A+2 | | FE (CPS_CCI.inf) |
| : | | : |
| A+4 | | FE (PLAYLIST) |
| A+5 | | FE (CLIPINF) |
| : | | : |
| A+7 | | FE (STREAM) |

INFORMATION RECORDING/REPRODUCING APPARATUS, INFORMATION RECORDING/REPRODUCING METHOD, PROGRAM STORAGE MEDIUM, AND PROGRAM

BACKGROUND OF THE INVENTION

The present invention relates to an information recording/reproducing apparatus, an information recording/reproducing method, a program storage medium, and a program. More particularly, the invention relates to an information recording/reproducing apparatus, an information recording/reproducing method, a program storage medium, and a program for arranging specific files into groups by attribute for rapid recording and reproduction so that file systems not designed to handle files in such a manner may deal with the files in groups for high-speed processing.

Techniques to record files onto mass storage media are coming into general use today.

Diverse formats have been proposed in which to write files to such media.

For example, UDF (Universal Disc Format) has been proposed for and used by DVD's (Digital Versatile Disc). This format is discussed illustratively in "Universal Disk Format Specification Revision 2.01," published on Mar. 15, 2000, by the Optical Storage Technology Association.

The above-cited UDF is characterized in that it allows a large number of files to be recorded in a dispersed manner on the medium. Moreover, with UDF, information for indicating the locations of files on the medium is stored between the files in what is called "nested" fashion. It follows that numerous addresses may need to be accessed before a desired file can be acquired. If moving pictures are recorded in that fashion on the storage medium, it sometimes becomes impossible to ensure that the pictures are suitably timed in sequence when reproduced. That is, smooth reproduction of moving pictures could be jeopardized.

SUMMARY OF THE INVENTION

The present invention has been made in view of the above circumstances and provides an apparatus, a method, a program storage medium and a program such that, if a format like UDF is used allowing numerous files to be recorded in dispersed fashion on a storage medium, those of the files that need to be read at high speed are put into groups for efficient management whereby the necessary files are guaranteed to be timed properly in sequence for smooth moving picture reproduction.

According to the first aspect of the present invention, there is provided an information recording/reproducing apparatus including:
a recording section for recording files to a storage medium;
an arranging section for arranging the files into groups by attribute so as to establish allocation of the files on the storage medium; and
a controlling section for controlling the recording section so as to record the files to the storage medium based on the allocation established by the arranging section and to record concurrently allocation information reflecting the allocation to a predetermined location on the storage medium.

According to the second aspect of the present invention, there is provided an information recording/reproducing method including the steps of:
recording files to a storage medium;
arranging the files into groups by attribute so as to establish allocation of the files on the storage medium; and
controlling the recording step so as to record the files to the storage medium based on the allocation established in the arranging step and to record concurrently allocation information reflecting the allocation to a predetermined location on the storage medium.

According to the third aspect of the present invention, there is provided a program storage medium which stores a program in a manner readable by a computer, the program including the steps of:
arranging the files into groups by attribute so as to establish allocation of the files on a storage medium; and
exerting control so as to record the files to the storage medium based on the allocation established in the arranging step and to record concurrently allocation information reflecting the allocation to a predetermined location on the storage medium.

According to the fourth aspect of the present invention, there is provided a program for causing a computer to execute the steps including:
arranging the files into groups by attribute so as to establish allocation of the files on a storage medium; and
exerting control so as to record the files to the storage medium based on the allocation established in the arranging step and to record concurrently allocation information reflecting the allocation to a predetermined location on the storage medium.

According to the fifth aspect of the present invention, there is provided an information recording/reproducing apparatus including:
a reading section for reading either files recorded in groups by attribute on a storage medium or allocation information about the files allocated in each of the groups on the storage medium; and
a controlling section for controlling the reading section so as to read the files from the storage medium based on the allocation information.

According to the sixth aspect of the present invention, there is provided an information recording/reproducing method including the steps of:
reading either files recorded in groups by attribute on a storage medium or allocation information about the files allocated in each of the groups on the storage medium; and
controlling the reading step so as to read the files from the storage medium based on the allocation information.

According to the seventh aspect of the present invention, there is provided a program storage medium which stores a program in a manner readable by a computer, the program including the steps of:
reading either files recorded in groups by attribute on a storage medium or allocation information about the files allocated in each of the groups on the storage medium; and
controlling the reading step so as to read the files from the storage medium based on the allocation information.

According to the eighth aspect of the present invention, there is provided a program for causing a computer to execute the steps including:
reading either files recorded in groups by attribute on a storage medium or allocation information about the files allocated in each of the groups on the storage medium; and
controlling the reading step so as to read the files from the storage medium based on the allocation information.

According to the ninth aspect of the present invention, there is provided an information recording/reproducing apparatus including:

a recording section for recording files to a storage medium;

an arranging section for arranging the files into groups by attribute so as to establish allocation of the files in a predetermined sequence in each of the groups; and a controlling section for controlling the recording section so as to record the files to the storage medium in accordance with the predetermined sequence based on the allocation established by the arranging section.

According to the tenth aspect of the present invention, there is provided an information recording/reproducing method including the steps of:

recording files to a storage medium;

arranging the files into groups by attribute so as to establish allocation of the files in a predetermined sequence in each of the groups; and controlling the recording step so as to record the files to the storage medium in accordance with the predetermined sequence based on the allocation established in the arranging step.

According to the eleventh aspect of the present invention, there is provided a program storage medium which stores a program in a manner readable by a computer, the program including the steps of:

arranging the files into groups by attribute so as to establish allocation of the files in a predetermined sequence in each of the groups; and exerting control so as to record the files to a storage medium in accordance with the predetermined sequence based on the allocation established in the arranging step.

According to the twelfth aspect of the present invention, there is provided a program for causing a computer to execute the steps including:

arranging the files into groups by attribute so as to establish allocation of the files in a predetermined sequence in each of the groups; and exerting control so as to record the files to a storage medium in accordance with the predetermined sequence based on the allocation established in the arranging step.

Other objects, features and advantages of the invention will become more apparent upon a reading of the following description and appended drawings.

BRIEF DESCRIPTION OF THE DRAWINGS

FIG. 8 is an explanatory view of file system information;

FIG. 9 is a tabular view showing the presence or absence of changes applicable to user operations performed on different files under group management;

FIG. 10 is a tabular view explaining a procedure for access to files in UDF format;

FIG. 11 is another tabular view explaining the procedure for access to files in UDF format;

FIG. 12 is a flowchart of steps constituting a recording process performed by the recording/reproducing mechanism in FIG. 2;

FIG. 15 is an explanatory view of gathered information;

FIG. 35 is an explanatory view of a typical structure of files recorded in the recording process performed by the recording/reproducing mechanism in FIG. 32;

DETAILED DESCRIPTION OF THE PREFERRED EMBODIMENTS

Figure 1:
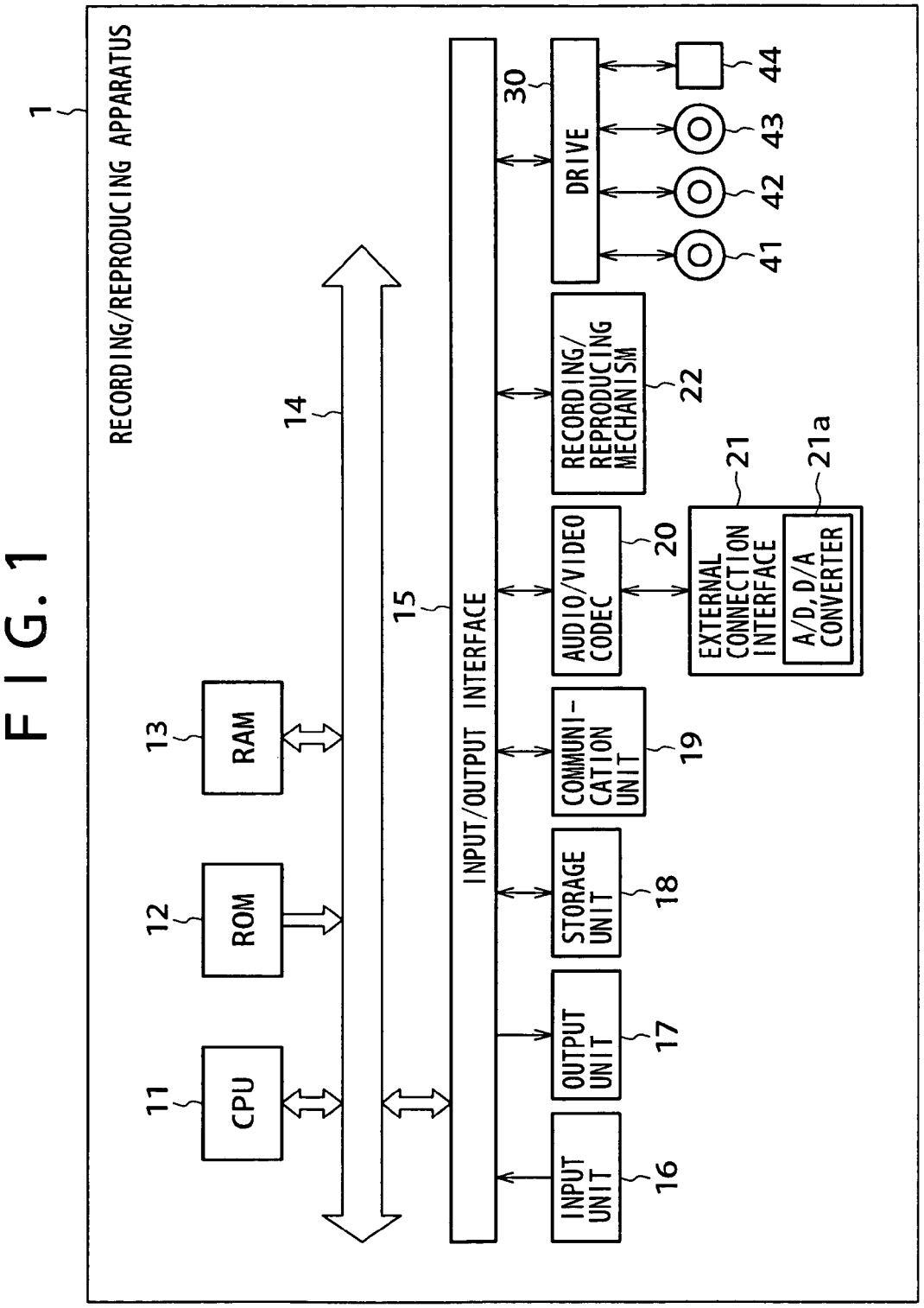
FIG. 1 is a block diagram of a recording/reproducing apparatus embodying this invention.

What is described below as the preferred embodiments of this invention corresponds to the appended claims as follows: the description of the preferred embodiments basically confirms specific examples supporting what is claimed. If any example of the invention described below as a preferred embodiment does not have an exactly corresponding claim, this does not mean that the example in question has no relevance to the claims. Conversely, if any example of the invention described hereunder has a specifically corresponding claim, this does not mean that the example in question has no relevance to any other claims.

Furthermore, the description below of the preferred embodiment does not claim to include all examples corresponding to the whole claims. In other words, the description hereunder does not limit or deny any inventive entities which are not covered by the appended claims of this invention but which may be added or brought about by this applicant in the future by divisional application or by amendment.

The first information recording/reproducing apparatus of the present invention includes: a recording element (e.g., writing unit 73 in FIG. 2) for recording files to a storage medium; an arranging element (file system information creating unit 62 in FIG. 2) for arranging the files into groups by attribute so as to establish allocation of the files on the storage medium; and a controlling element (e.g., control unit 51 in FIG. 2) for controlling the recording element so as to record the files to the storage medium based on the allocation established by the arranging element and to record concurrently allocation information reflecting the allocation to a predetermined location on the storage medium.

The first information recording/reproducing method of the present invention includes the steps of: recording (in step S4 of the flowchart in FIG. 12) files to a storage medium; arranging (in step S3 of the flowchart in FIG. 12) the files into groups by attribute so as to establish allocation of the files on the storage medium; and controlling (in step S5 of the flowchart in FIG. 12) the recording step so as to record the files to the storage medium based on the allocation established in the arranging step and to record concurrently allocation information reflecting the allocation to a predetermined location on the storage medium.

The second information recording/reproducing apparatus of the present invention includes: a reading element (e.g., reading unit 91 in FIG. 2) for reading either files recorded in groups by attribute on a storage medium or allocation information about the files allocated in each of the groups on the storage medium; and a controlling element (e.g., file system information recognizing unit 61 in FIG. 2) for controlling the reading element so as to read the files from the storage medium based on the allocation information.

The second information recording/reproducing method of the present invention includes the steps of: reading (e.g., in step S12 of the flowchart in FIG. 19) either files recorded in groups by attribute on a storage medium or allocation information about the files allocated in each of the groups on the storage medium; and controlling (e.g., in step S14 of the flowchart in FIG. 19) the reading step so as to read the files from the storage medium based on the allocation information.

The third information recording/reproducing apparatus of the present invention includes: a recording element (e.g., writing unit 73 in FIG. 32) for recording files to a storage medium; an arranging element (e.g., file system information creating unit 342 in FIG. 32) for arranging the files into groups by attribute so as to establish allocation of the files in a predetermined sequence in each of the groups; and a controlling element (e.g., control unit 51 in FIG. 32) for controlling the recording element so as to record the files to the storage medium in accordance with the predetermined sequence based on the allocation established by the arranging element.

The third information recording/reproducing method of the present invention includes the steps of: recording (e.g., in step S83 of the flowchart in FIG. 33) files to a storage medium; arranging (e.g., in step S82 of the flowchart in FIG. 33) the files into groups by attribute so as to establish allocation of the files in a predetermined sequence in each of the groups; and controlling (e.g., in step S83 of the flowchart in FIG. 33) the recording step so as to record the files to the storage medium in accordance with the predetermined sequence based on the allocation established in the arranging step.

The program storage medium and the program according to the invention constitute a vehicle that carries the inventive information recording/reproducing method outlined above and thus will not be described further.

FIG. 1 shows a typical structure of a recording/reproducing apparatus 1 embodying this invention.

A CPU (central processing unit) 11 carries out diverse processes in accordance with programs held in a ROM (read only memory) 12 or in a storage unit 18. A RAM (random access memory) 13 accommodates the programs or data to be carried out or operated on by the CPU 11 as needed. The CPU 11, ROM 12, and RAM 13 are interconnected via a bus 14.

An input/output interface 15 is connected to the CPU 11 through the bus 14. The input/output interface 15 is connected with an input unit 16 made up of a keyboard, a mouse and a microphone, and with an output unit 17 formed by a display device and speakers. The CPU 11 performs various processes in response to commands entered from the input unit 16. Pictures and sounds resulting from the processing by the CPU 11 are forwarded to the output unit 17.

The storage unit 18 connected to the input/output interface 15 is illustratively composed of a hard disk drive and accommodates the programs and various data to be carried out and operated on by the CPU 11. A communication unit 19 communicates with an externally furnished information processing apparatus such as a server over a network exemplified by the Internet or an intranet.

The storage unit 18 holds a number of programs to be read out by the CPU 11. The programs thus retrieved allow the CPU 11 to carry out corresponding processes. Illustratively, the storage unit 18 stores an operating system (OS) and drivers. Some of the programs to be stored into the storage unit 18 may be acquired through the communication unit 19.

An audio/video codec 20 receives audio and video data files in suitably compressed form from a magnetic disc 41, an optical disc 42, a magneto-optical disc 43, or a semiconductor memory 44 loaded in a drive 30, or from a storage medium 81 (FIG. 2) placed in a recording/reproducing mechanism 22. The compressed files are expanded by the audio/video codec 20 before being sent to an external connection interface 21 and to the output unit 17. The audio/video codec 20 also receives video and audio signals fed from the input unit 16 or from the external connection interface 21, and forwards the received signals in suitably compressed form to the magnetic disc 41, optical disc 42, magneto-optical disc 43, or semiconductor memory 44 loaded in the drive 30 or to the storage medium 81 (FIG. 2) placed in the recording/reproducing mechanism 22 for recording onto the medium.

The recording/reproducing mechanism 22 writes and reads specific information to and from the storage medium 81 (FIG. 2) that may be a magneto-optical storage medium such as a Blu-Ray Disc (trademark). A detailed structure of the recording/reproducing mechanism 22 will be discussed later with reference to FIG. 2.

The drive 30 connected to the input/output interface 15 accommodates the magnetic disc 41, optical disc 42, magneto-optical disc 43, or semiconductor memory 44. When one of these storage media is loaded, the drive 30 acquires the programs and data recorded on the loaded medium. The programs and data thus acquired are transferred as needed to the storage unit 18 for storage therein.

How the recording/reproducing apparatus 1 of FIG. 1 works will now be described.

A command may be entered from the input unit 16 requiring the CPU 11 to record input data that have been supplied through the external connection interface 21. In that case, the CPU 11 compresses the input data in a predetermined format by suitably controlling the audio/video codec 20 in accordance with the relevant programs held in the ROM 12, RAM 13 or storage unit 18. The input data thus compressed by the audio/video codec 20 are forwarded to the recording/reproducing mechanism 22. In turn, the recording/reproducing mechanism 22 writes the compressed input data to the storage medium 81 (FIG. 2), to be described later.

Another command may be entered from the input unit 16 requiring the CPU to reproduce the data recorded on the storage medium 81 placed in the recording/reproducing mechanism 22. In that case, the CPU 11 controls the recording/reproducing mechanism 22 so as to retrieve the data from the storage medium 81 in keeping with the relevant programs held in the ROM 12, RAM 13, or storage unit 18. The data thus retrieved are fed to the audio/video codec 20. In turn, the audio/video codec 20 is controlled to expand the input data in a predetermined format before sending the expanded data either to the outside through the external connection interface 21 or to the output unit 17 for audio and/or video output.

A detailed structure of the recording/reproducing mechanism 22 will now be described with reference to FIG. 2.

A control unit 51 controls the operation of the recording/reproducing mechanism 22 as a whole. Based on control signals fed from the CPU 11, the control unit 51 causes a recording unit 52 to write information to the storage medium 81 in a recording/reproducing block 53 or controls a reproducing unit 54 so as to read information from the storage medium 81 in the recording/reproducing block 53.

A file system information creating unit 62 in the control unit 51 creates file system information and "gathered" files necessary for arranging files of input data into groups by attribute (the process is called group management), and supplies what is created to the recording unit 52. The gathered files (i.e., Gathered.inf file) are files that record a management structure for managing by attribute the grouped files needed to be read out first upon file retrieval from the storage medium 81. The gathered files will be discussed later in more detail.

A file system information recognizing unit 61 in the control unit 51 reads the file system information supplied by the reproducing unit 54 to read relevant files in keeping with that file system information. When the file system information recognizing unit 61 reads the gathered files and analyzes the information recorded therein, the unit 61 recognizes the management structure of the files under group management. On the basis of the management structure thus recognized, the control unit 51 (specifically, the file system information recognizing unit 61) causes a reading unit 91 to read necessary files. In the description that follows, the information recorded in the gathered files will be referred to as the gathered information.

The recording/reproducing block 53 under control of a writing unit 73 or a reading unit 91 writes or reads information physically to or from the storage medium 81. The storage medium 81 is a disc-like recordable medium of any type capable of having data written and read thereto and therefrom in mechanical, optical, magnetic, or magneto-optical fashion. The storage medium 81 may be one which has data written to it either once or repeatedly, such as a DVD-RW (Digital Versatile Disc-Rewritable), a DVD-RAM (Digital Versatile Disc-Random Access Memory), a DVD-R (Digital Versatile Disc-Recordable), or a DVD-ROM (Digital Versatile Disc-Read Only Memory). In any case, the recording/reproducing block 53 need only be structured so as to write and read data to and from the storage medium 81.

An ECC encoding unit 71 supplements input data with ECC (error-correcting code) and encodes the data for output to a modulating unit 72. The modulating unit 72 modulates the data coming from the ECC encoding unit 71 and forwards the modulated data to the writing unit 73. In turn, the writing unit 73 supplies the recording/reproducing block 53 with the data coming from the modulating unit 72 and causes the block 53 to write the input data to the storage medium 81.

The reading unit 91 in the reproducing unit 54 reads data from the storage medium 81. A demodulating unit 92 demodulates the data read from the storage medium 81 by the reading unit 91 and sends the demodulated data to an ECC decoding unit 93. The ECC decoding unit 93 separates the data coming from the demodulating unit 92 into ordinary files (e.g., AV (audio visual) stream data) and file system information. The ordinary files are provided as output data, and the file system information is sent to the control unit 51.

Figure 3:
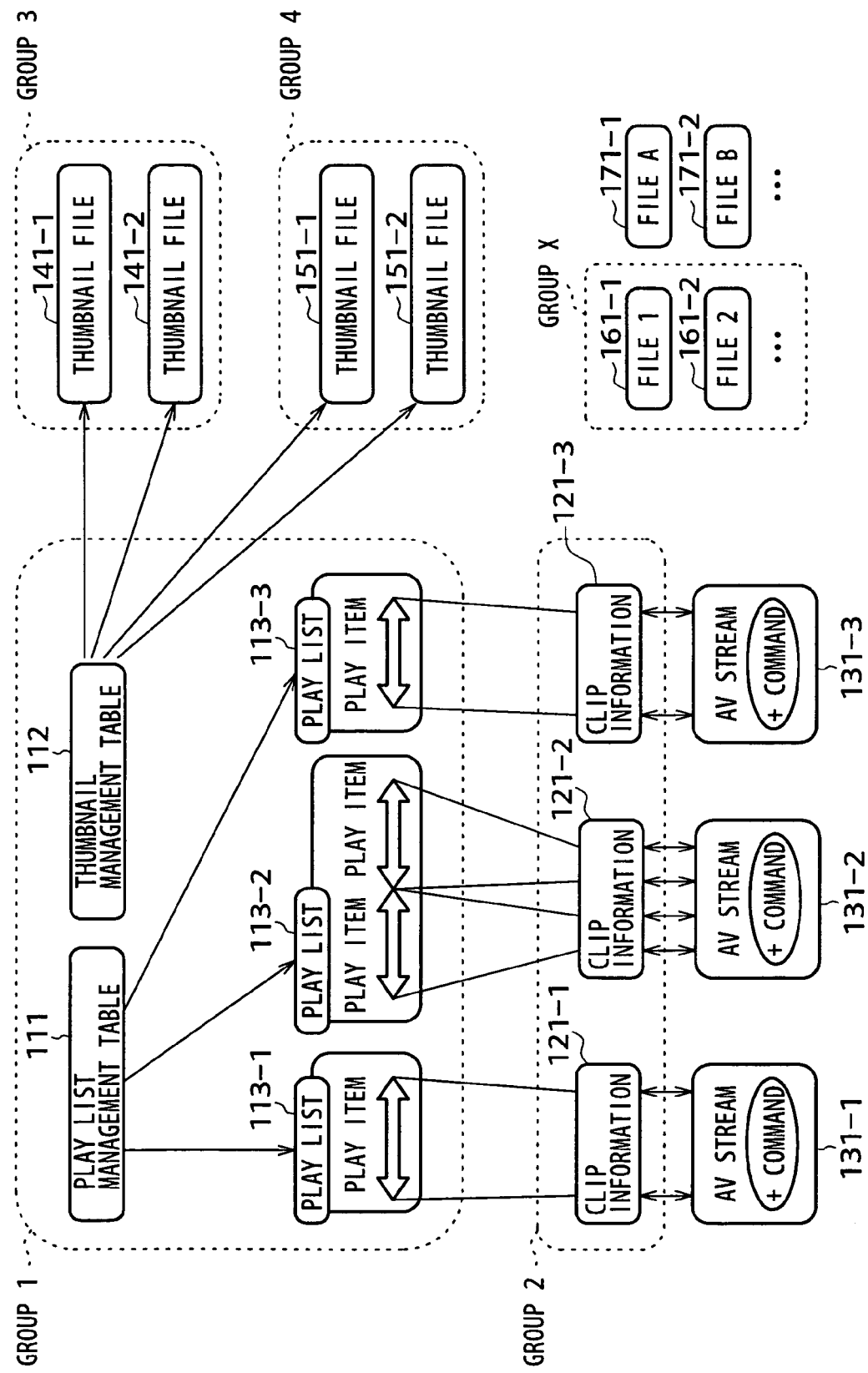
FIG. 3 is a schematic view showing a typical setup of group management.

Described below with reference to FIG. 3 is the management structure of input data files managed in groups by the file system information creating unit 62. Generally, files are recorded on the storage medium 81 in UDF format. That is, files are all recorded in UDF format on the storage medium 81 in keeping with the management structure to be described below.

FIG. 3 schematically shows a typical setup of group management over various data files for use in the recording of AV stream data onto a rewritable storage medium. The management structure of this setup is based on the Blu-Ray Disc Rewritable (trademark) standard (however, the recording format is UDF). FIG. 3 indicates three layers: a content management layer, a play list layer, and a clip layer from the top down.

The content management layer includes a play list management table 111 and a thumbnail management table 112; the play list layer includes play lists 113-1 through 113-3; and the clip layer has clip information 121-1 through 121-3. In the description that follows, the play lists 113-1 through 113-3 will be generically referred to as the play list 113 and the clip information 121-1 through 121-3 as the clip information 121 if there is no specific need for distinction therebetween. The same generic reference will also apply to the other structures that may be described below.

The combination of a file of the AV stream 131 with a file of the clip information 121 (i.e., attribute information on AV stream) is called a clip. The AV stream 131 is illustratively constituted by MPEG-TS (Moving Picture Experts Group-Transport Stream) data. These data are arranged into files in which video, audio and subtitle data are multiplexed. In some cases, the AV stream 131 may have command information multiplexed therein for control over reproduction. The example in FIG. 3 shows that command information is multiplexed in the AV stream.

Each play list contains a plurality of play items each referencing a specific range of a clip using a reproduction starting point and a reproduction ending point. That is, one play list allows a plurality of reproduction sequences to be reproduced consecutively. Also provided are the play list management table 111 for presenting a table of play lists, the thumbnail management table 112 for use with a thumbnail display function, and thumbnail files 141-1, 141-2, 151-1 and 151-2 corresponding to the provided tables.

One AV stream 131 paired with its attached information is regarded as an object called a clip. Each clip as the object is placed in a file called an AV stream file. The information attached to such AV stream files is called the clip information 121.

Generally, files used by computers are handled in increments of bytes. By contrast, the content of the AV stream 131 is furnished along the time axis. The play list 113 designates access points in the clip information 121 by use of time stamps. When the time stamp of an access point in a clip is given by the play list 113, the clip information 121 is used to find information representing the address (i.e., data byte location) at which to start decoding the AV stream 131.

The play list 113 is adopted to let the user select desired segments to be reproduced in the clip and edit the selected segments with ease. Each play list 113 is a collection of segments to be reproduced in a clip. These segments are called a play item each. A play item is represented by an in-point and an out-point along the time axis. The play list is thus a collection of play items.

In FIG. 3, the files are arranged into groups according to the frequency of use or update and in keeping with the maximum total size of files constituting a group. Specifically, the play list management table 111, thumbnail management table 112, and play list 113 are put into group 1; the clip information 121 is placed into group 2; the thumbnail files 141-1 and 141-2 for menu use are arranged into group 3; and the thumbnail files 151-1 and 151-2 for marking use are classified into group 4.

These grouped files hold management data that are needed upon reproduction of the AV stream 131. When the management data are extracted and controlled in a unified manner, it is possible to retrieve the management data quickly. That in turn makes it possible to reproduce AV stream data at high speed.

Whereas the foregoing description has shown how the management data files for the AV stream 131 are grouped, it is also possible to group files not defined by the Blu-Ray Disc Rewritable standard. In FIG. 3, group X is defined to include files 161-1 and 161-2 which are different from the management data files for the AV stream 131. Files 171-1 and 171-2 are indicated as files yet to be grouped. The AV stream 131 is not formed by the management data and thus not placed under group management.

Figure 4:
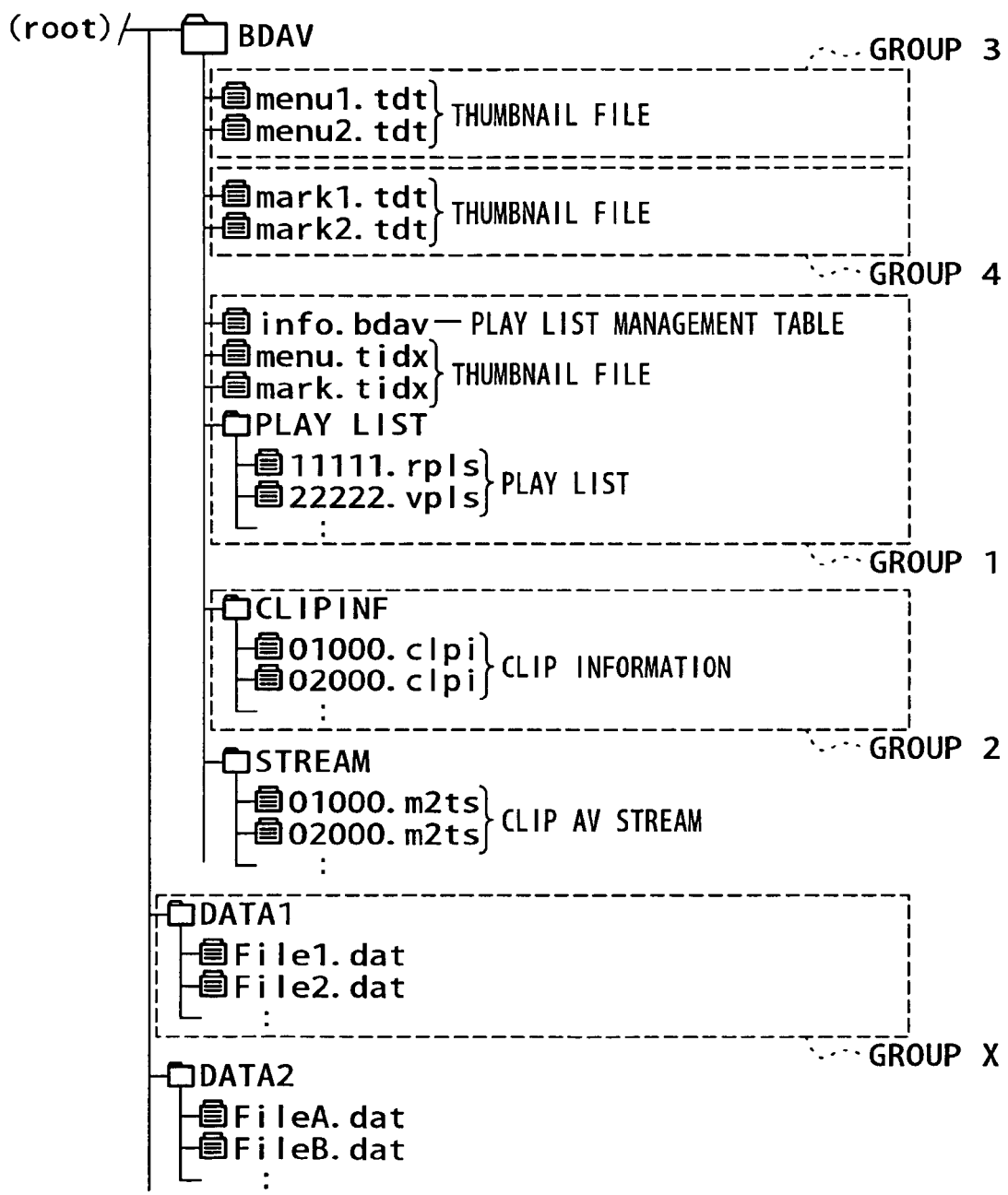
FIG. 4 is a schematic view outlining a typical structure of directories and files created by the setup of group management in FIG. 3.

FIG. 4 schematically shows a typical directory structure of Blu-Ray Disc Audio Visual (BDAV) information recorded on the storage medium 81 and defined by the Blu-Ray Disc Rewritable format (BD-RE). Under a root directory may be created other directories than those shown. However, such directories are ignored in the case of recording in UDF format.

As shown in FIG. 4, the root directory subsumes one directory.

Under a "BDAV" directory are recorded all files and directories defined by the BDAV application format. The "BDAV" directory subsumes the directories that are explained below.

Under a "PLAYLIST" directory are recorded database files of the play list 113. This directory is established even if there is no play list 113.

Under a "CLIPINF" directory are recorded clip database files. This directory is established even if there is no clip.

Under a "STREAM" directory are recorded AV stream files. This directory is established even if there is no AV stream file.

Under the "PLAYLIST" directory, two kinds of play list files are recorded: a real play list and a virtual play list. In the structure of FIG. 4, files "11111.rpls" and "22222.vpls" are shown recorded. Of such files, a file identified by "xxxxx.rpls" holds information about a single real play list. The file "xxxxx.rpls" is created for each real play list. Here, "xxxxx" is formed by five integers each ranging from 0 to 9.

A file identified by "yyyyy.vpls" holds information about a single virtual play list. The file "yyyyy.vpls" is created for each virtual play list. The file name "yyyyy" is formed by five integers each ranging from 0 to 9.

The real play list is considered to share the stream of the clip it references. In other words, the real play list on the disc takes up the capacity of the data corresponding to the AV stream of the clip it references. When an AV stream is recorded as a new clip, a real play list is created to reference the reproducible range of the entire clip. If part of the reproducible range is deleted from the real play list, the corresponding stream portion of the referenced clip is also deleted.

The virtual play list is not considered to share any clip data. If any virtual play list is modified or deleted, the clips remain unchanged. In the ensuing description of this specification, the real play list and virtual play list may be generically referred to as the play list.

The "CLIPINF" directory holds one file corresponding to each AV stream file. In the structure of FIG. 4, the "CLIPINF" directory retains files "01000.clpi" and "02000.clpi." A file identified by "zzzzz.cpli" holds the clip information 121 corresponding to a single AV stream 131. The file name "zzzzz" is formed by five integers each ranging from 0 to 9.

The "STREAM" directory holds AV stream files. In the structure of FIG. 4, the "STREAM" directory retains files "01000.m2ts" and "02000.m2ts."

A file identified by "zzzzz.m2ts" is a file of the AV stream 131. The file name "zzzzz" is formed by five integers each ranging from 0 to 9. The file of the AV stream 131 and the corresponding clip information 121 are each assigned the same five digits "zzzzz" as their file name.

Immediately under the "BDAV" directory are files "menu1.tdt" and "menu2.tdt" representing the thumbnail files 141-1 and 141-2, as well as files "mark1.tdt" and "mark2.tdt" denoting the thumbnail files 151-1 and 151-2. Also retained under the "BDAV" directory is a file "info.bdav" corresponding to the play list management table 111 and files "menu.tidx" and "mark.tidx" representative of the thumbnail management table 112.

Immediately under the "root" directory are established a "DATA1" directory and a "DATA2" directory. The "DATA1" directory subsumes files "File1.dat," "File2.dat," etc., corresponding to the files 161-1 and 161-2, as well as files "FileA.dat," "FileB.dat," etc., associated with the files 171-1 and 171-2, all under group management.

In the structure in FIG. 4 of the directories and of the files managed under these directories, the files "menu1.tdt" and "menu2.tdt" denoting the thumbnail files 141-1 and 141-2 are held in group 3; the files "mark1.tdt" and "mark2.tdt" representing the thumbnail files 151-1 and 151-2 are placed in group 4; the file "info.bdav" corresponding to the play list management table 111, files "menu.tidx" and "mark.tidx" associated with the thumbnail management table 112, and files "11111.rpls" and "22222.vpls" kept under the "PLAYLIST" directory are retained in group 1; and the files "01000.clpi" and "02000.clpi" are put in group 2. This structure reflects that which is illustrated in FIG. 3.

Other than the above-mentioned files under BDFS (Blu-Ray Disc file system)-based group management, the files "File1.dat," "File2.dat," etc., corresponding to the files 161-1 and 161-2 placed under the "DATA1" directory are classified into group X.

Figure 5:
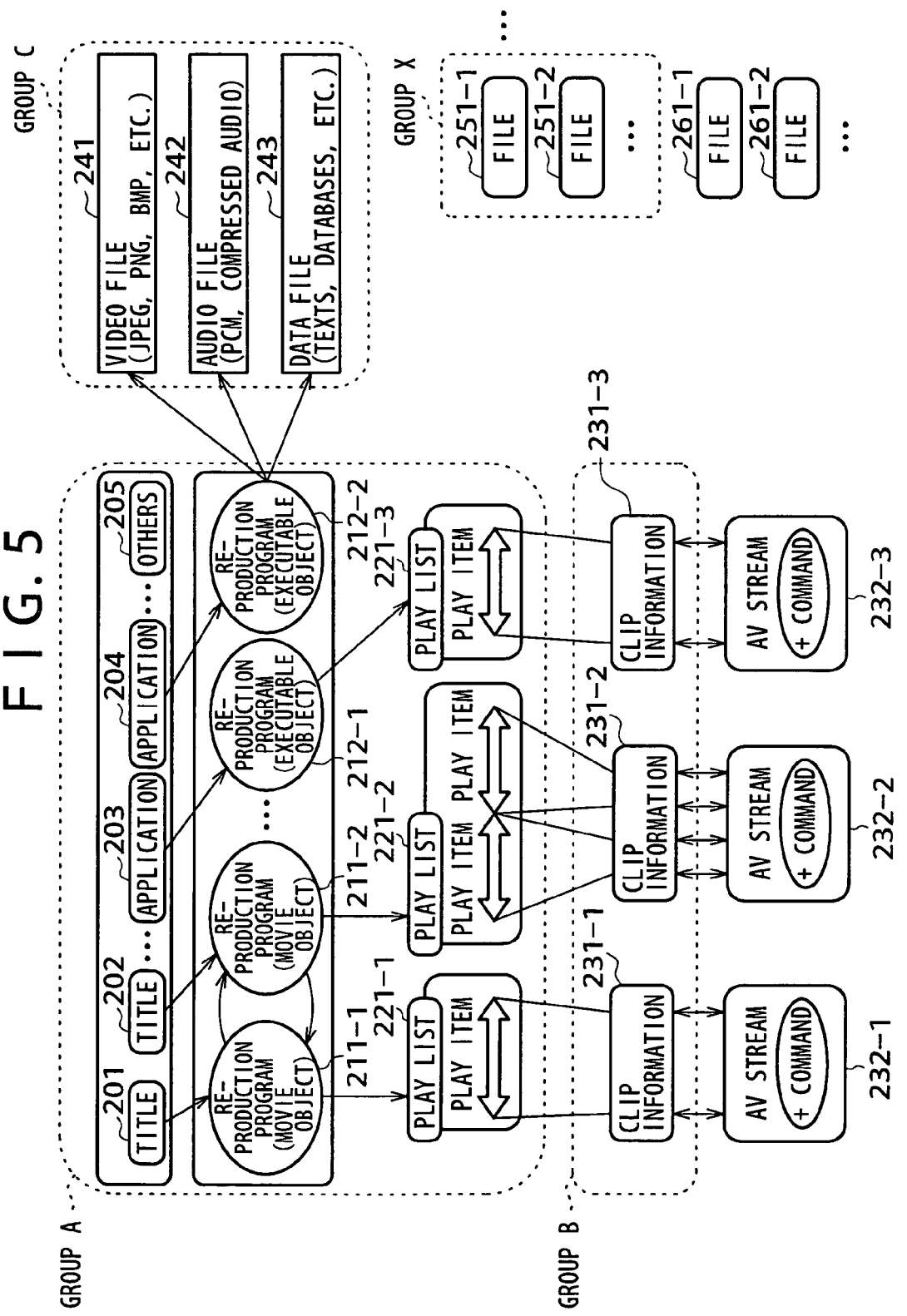
FIG. 5 is a schematic view indicating another typical setup of group management.
Figure 6:
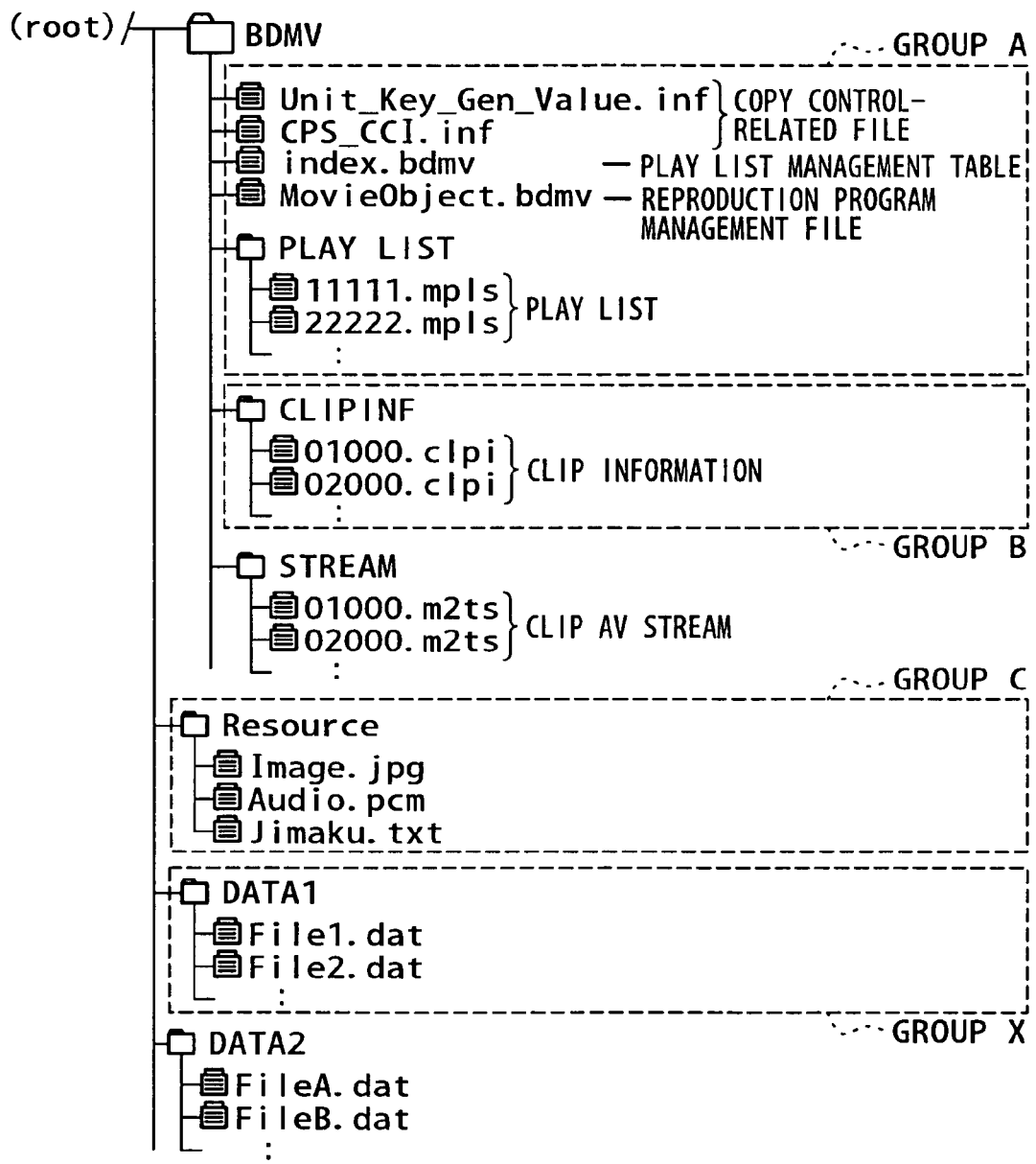
FIG. 6 is a schematic view depicting a typical structure of directories and files created by the setup of group management in FIG. 5.

FIGS. 3 and 4 have shown the typical management structure wherein the files based on the Blu-Ray Disc Rewritable standard and recorded in UDF format on the storage medium 81 (i.e., rewritable storage medium) are managed in groups. What is shown next in FIGS. 5 and 6 is a typical structure in which to manage files in groups on the Blu-Ray Disc ROM (read-only storage medium). FIG. 5 indicates an example in which HD (high density) movie content items are recorded.

In FIG. 5, play lists 221-1 through 221-3 are similar to the 113-1 through 113-3 shown in FIG. 3. Likewise, clip information 231-1 through 231-3 is similar to the clip information 121-1 through 121-3; AV streams 232-1 through 232-3 to the AV streams 131-1 through 131-3; files 251-1 and 251-2 to the files 161-1 and 161-2; and files 261-1 through 261-2 to the files 171-1 and 171-2. Given the similarities, the descriptions of these files, information and streams will be abbreviated or omitted where redundant.

Above the clip information 231 and play list 221 whose counterparts were discussed with reference to FIG. 3, there exist two layers, one including reproduction programs 211-1 and 211-2 (movie objects), the other including titles 201 and 202. The reproduction program 211 (movie object) offers in programmable fashion such functions necessary for presenting high density movie content as the designation of a play list to be reproduced, responses to the user's operations, jumps between titles 201 and 201, and branches to reproduction sequences.

The titles 201 and 202 can be recognized by the user and are thus used as indexes by which to start content reproduction. The titles 201 and 202 are each structured to designate one movie object to be executed. In addition to ordinary titles, there are titles to be first reproduced automatically upon start-up as well as titles used to display menus.

Applications (i.e., application programs) 203 and 204 are used to execute games and web content items constituting extended applications. The execution involves starting up and carrying out reproduction programs (executable objects) 212-1 and 212-2. The reproduction program 212 may or may not use a play list. The reproduction program 212 can reference any video file 241, audio file 242, and data file 243 in the application programs 203 and 204.

It is possible to increase the number of titles 201 and 202 indicative of the HD movie content items as well as the number of applications 203 and 204. These additional files are indicated as "others" 205 in FIG. 5. The titles, applications and others may be recorded in mixed fashion on the storage medium 81, as illustrated in FIG. 5.

In FIG. 5, as in FIG. 3, the files are arranged into groups according to the frequency of use or update and in keeping with the maximum total size of files constituting a group. Specifically, the titles 201 and 202, applications 203 and 204, others 205, reproduction programs 211-1, 211-2, 212-1, 212-2, and play lists 221-1 through 221-3 are placed into group A; the clip information 231 is put into group B; and the video file 241, audio file 242, and data file 243 are classified into group C.

The groups A, B and C in FIG. 5, like the groups 1, 2, 3 and 4 in FIG. 3, are so named only for purpose of explanation. Each of these groups simply designates a collection of files to be processed.

FIG. 6 schematically shows a typical directory structure of the Blu-Ray Disc Movie (BDMV) information recorded on the storage medium 81 and defined by the Blu-Ray Disc ROM format (BD-ROM). Under the root directory may be created other directories than those shown. However, such directories are ignored in the case of recording in UDF format.

As shown in FIG. 6, the root directory subsumes one directory.

Under a "BDMV" directory are recorded all files and directories defined by the BDMV application format. The "BDMV" directory subsumes the directories that are explained below.

Under a "PLAYLIST" directory are recorded database files of the play list 221. This directory is established even if there is no play list 221.

Under a "CLIPINF" directory are recorded clip database files. This directory is established even if there is no clip.

Under a "STREAM" directory are recorded AV stream files. This directory is established even if there is no AV stream file.

Under the "PLAYLIST" directory, two play list files "11111.mpls" and "22222.mpls" are recorded as shown in FIG. 6. Of such files, a file identified by "xxxxx.mpls" holds information about a single movie play list. The file "xxxxx.mpls" is created for each movie play list. The file name "xxxxx" is formed by five integers each ranging from 0 to 9.

The "CLIPINF" directory holds one file corresponding to each AV stream file. In the structure of FIG. 6, files "01000.clps" and "02000.clpi" are retained.

A file identified by "zzzzz.cpli" holds the clip information 231 corresponding to a single AV stream 232. The file name "zzzzz" is formed by five integers each ranging from 0 to 9.

The "STREAM" directory holds AV stream files. In the structure of FIG. 6, the "STREAM" directory retains files "01000.m2ts" and "02000.m2ts."

A file identified by "zzzzz.m2ts" is a file of the AV stream 232. The file name "zzzzz" is formed by five integers each ranging from 0 to 9. The file of the AV stream 232 and the corresponding clip information 231 are each assigned the same five digits "zzzzz" as their file name.

Immediately under the "BDMV" directory are files "Unit_Key_Gen_Value.inf" and "CPS_CCI.inf" related to copy control, as well as a file "index.bdmv" associated with a title management table. Also retained under the "BDMV" directory is a file "MovieObject.bdmv" representative of a reproduction program management table.

Immediately under the "root" directory are established a "Resource" directory, a "DATA1" directory, and a "DATA2" directory. Although these directories are not mandatory for the Blu-Ray Disc ROM format, they are added here as typical directories under which to store extended data that may be needed depending on the nature of content. The "Resource" directory holds files "Image.jpg," "Audio.pcm," and "Jimaku.txt" corresponding to the video file 241, audio file 242, and data file 243 respectively, placed under group management. The "DATA1" directory retains files "File1.dat," "File2.dat," etc., corresponding to the files 251-1 and 251-2. The "DATA2" directory holds files "FileA.dat," "FileB.dat," etc., corresponding to the files 261-1 and 261-2.

In the structure in FIG. 6 of the directories and of the files managed under these directories, the files "Unit_Key_Gen_Value.inf," "CPS_CCI.inf," "index.bdmv" and "MovieObject.bdmv," as well as the files "11111.mpls" and "22222.mpls" kept under the "PLAYLIST" directory are placed into group A; the files "01000.clpi" and "02000.clpi" under the "CLIPINF" directory are arranged into group B; and the files "Image.jpg," "Audio.pcm," and "Jimaku.txt" under the "Resource" directory are classified into group C.

Other than the above-mentioned files under group management, the files "File1.dat," "File2.dat," etc., corresponding to the files 251-1 and 251-2 held under the "DATA1" directory are classified into group X.

Figure 7:
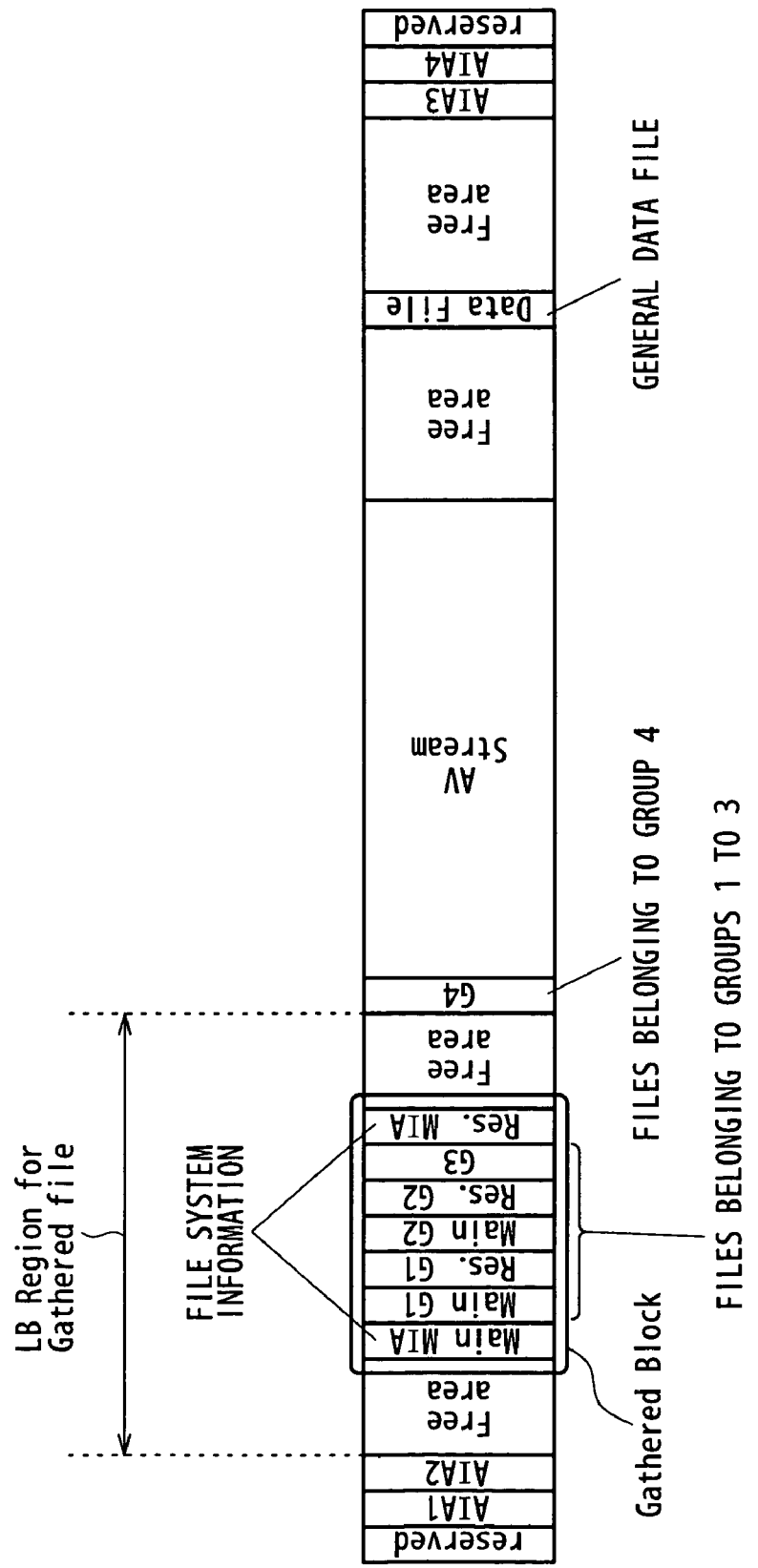
FIG. 7 is an explanatory view of typical allocation of data recorded on a storage medium.

Described below with reference to FIG. 7 is a typical file system (BDFS) based on the Blu-Ray Disc standard whereby files to be recorded are arranged into groups and are allocated in each group according to specific rules.

The starting and the ending locations of the belt-like storage portion shown in FIG. 7 are each provided with a blank data area named "reserved."

In FIG. 7, the areas indicated as AIA1 (allocation information area 1) through AIA4 are assigned fixed information. These items of information are first read out upon information retrieval from the storage medium. Specifically, AIA1 through AIA4 contain addresses at which file system information (as MIA's (management information areas)) is stored. Analyzing AIA's permits access to MIA's. AIA's contain information about two areas: a main MIA and a reserved MIA (for backup).

MIA's retain file system information (i.e., information about directories and files on the storage medium) which is variable. The file system information includes information about how the files are grouped and how the grouped files are allocated. According to the Blu-Ray Disc Rewritable standard, MIA's are recorded collectively in a gathered file area (i.e., a gathered block in the LB region for gathered files) as shown in FIG. 7, together with the files (MainG1, ResG1, MainG2, ResG2, G3) in groups 1 through 3, to be discussed below. These files are managed using grouping ID's called allocation classes set for each group. Illustratively, MainG1 is placed in allocation class 1 (AC1), MainG2 in AC2, G3 in AC3, and G4 in AC4 for management purposes.

MIA's store information about the locations of the files. For example, as shown in FIG. 8, MainG1 stores $S_{MG1}$ and $E_{MG1}$ as a starting and an ending address respectively. Likewise, ResG1 stores $S_{RG1}$ and $E_{RG1}$ as a starting and an ending address; MainG2 stores $S_{MG2}$ and $E_{MG2}$ as a starting and an ending address; ResG2 stores $S_{RG2}$ and $E_{RG2}$ as a starting and an ending address; G3 stores $S_{G3}$ and $E_{G3}$ as a starting and an ending address; and G4 stores $S_{G4}$ and $E_{G4}$ as a starting and an ending address. That is, the files in MainG1 are recorded between the starting address $S_{MG1}$ and the ending address $E_{MG1}$. Similarly, the files in ResG1 are recorded between $S_{RG1}$ and $E_{RG1}$; the files in MainG2 between $S_{MG2}$ and $E_{MG2}$; the files in ResG2 between $S_{RG2}$ and $E_{RG2}$; the files in G3 between $S_{G3}$ and $E_{G3}$; and the files in G4 between $S_{G4}$ and $E_{G4}$.

When the information is recorded as described above on the storage medium according to the Blu-Ray Disc Rewritable standard, it is possible to acquire the file system information as well as the files in groups 1 through 3 in a single continuous read-out pass. It should be noted that groups 1 through 4 in FIG. 7 comply with the grouping method discussed above with reference to FIGS. 3 and 4.

The files in groups 1 through 3 constitute application management data complying with the Blu-Ray Disc Rewritable standard. These files are recorded collectively in the gathered file area along with the above-described MIA's. That is because these files need to be retrieved at high speed from the storage medium. The files belonging to groups 1 and 2 are mandatory in reproducing content. Since it is necessary to maintain file data integrity as much as possible in case of faulty sectors on the storage medium, the files in groups 1 and 2 are recorded both in the main area and in the reserved area for backup.

The files in group 4 (indicated as G4 in FIG. 7) contain thumbnail information for marking use. Although these files need to be recorded collectively as well, they are used less often than those in groups 1 through 3 and need not be read out altogether at the start of access to the storage medium. For that reason, the files in group 4 are recorded in an area from which they can be retrieved collectively in one pass, but they are not recorded in the gathered file area along with the other groups.

AV stream files are given the attribute of guaranteeing the rate of reproduction. When allocated on the storage medium, AV stream files thus need to comply with relevant allocation rules that ensure the rate of reproduction. There is no need to arrange AV stream files into groups (i.e., they are outside groups 1 through 4 above) and to record them to any specific area on the storage medium. Thus file attributes are defined but the files are not allocated collectively in any specific area. Where general files not defined according to the Blu-Ray Disc standard are to be recorded, it is not necessary to guarantee the rate of their reproduction or to record them collectively to a particular area. For these reasons, general files (i.e., "data files" in FIG. 7) are recorded to different locations.

In FIG. 7, the areas indicated as "free area" each are regions in which no files are recorded.

The file system arrangement shown in FIG. 7 is merely an example of the file system based on the Blu-Ray Disc standard. The file system may alternatively be in compliance with some other suitable rules or standards. Such rules may be modified flexibly for the file system to better function.

Described below with reference to FIG. 9 are the general operations stipulated by the Blu-Ray Disc Rewritable standard as well as other operations irrelevant to that standard, each operation being symbolically marked to indicate the applicability of change occurring to the file system information as well as to the files in the different groups discussed above when the operation in question is carried out.

Referring to FIG. 9, the typical operations of specific applications include: "creating a play list," "dividing a play list," "combining play lists," "erasing an entire play list," "erasing a play list in part," "editing a virtual play list without using bridges," "editing a virtual play list using bridges," "erasing a virtual play list," "setting post-recording of audio data," "changing play list display order," "adding a menu thumbnail," and "adding a mark thumbnail." The typical operations of nonspecific applications are shown to include: "adding a nonstandard file (not based on the applications' standard, such as JPEG pictures)" and "deleting a nonstandard file."

In FIG. 9, the operations which, when executed, cause change to MIA's, to the files in groups 1 through 4 (G1 through G4 in the figure), to AV streams, or to nonspecific application files are each marked with a hollow circle; the operations that do not cause such change upon execution are marked with a dash (-) each.

As shown in FIG. 9, the processes of "creating a play list" and "editing a virtual play list without using bridges" cause change to MIA's, to the files in groups 1 and 2, and to the AV streams. The processes of "dividing a play list," "combining play lists," "erasing an entire play list," "erasing a play list in part," "editing a virtual play list using bridges," "erasing a virtual play list," "setting post-recording of audio data," and "changing play list display order" cause change to MIA's and to the files in group 1. The process of "adding a menu thumbnail" causes change to MIA's and to the files in groups 1 and 3. The process of "adding a mark thumbnail" causes change to MIA's and to the files in groups 1 and 4. The processes of "adding a nonstandard file (not based on the applications' standard, such as JPEG pictures)" and "deleting a nonstandard file" cause change to MIA's only.

As indicated above, all operations cause change to the file system information (MIA's). By contrast, the files in each group may or may not be changed depending on the operation.

Where the files in a group are to be changed, that is the case in which adding a new file to be recorded to the group changes contents of the recorded files so that the whole data need to be recorded again. If a file is erased, that simply means the area taken up by that file is no longer used. Then the whole group must be recorded again except for that file removed from the group of files recorded collectively in a specifically allocated area.

Described below with reference to FIGS. 10 and 11 is a typical procedure for gaining access to files in conventional UDF format. The description is made here in preparation for the ensuing description of recording processes to be performed according to this invention.

FIG. 10 shows a typical volume structure in UDF format, and FIG. 11 indicates a typical file structure with files. What is explained here is a procedure for accessing a file "root/BDMV/Unit_Key_Gen_Value.inf" shown in FIG. 11.

Referring to FIG. 10, the volume structure retains information about logical volumes and information about points at which to start analysis in the file structure and which are recorded within each partition. In FIG. 10, the leftmost column contains logical sector numbers (LSN), the second column from left indicates structure elements, the second column from right depicts descriptors, and the rightmost column gives logical block numbers (LBN). In FIG. 11, the leftmost column presents logical block numbers (LBN), the middle column indicates structure elements, and the rightmost column shows descriptors.

An address in a volume is expressed by LSN (logical sector number), and an address in a partition by LBN (logical block number). If there exist a plurality of partitions in a volume, a logical volume descriptor may be used to accommodate information about the multiple partitions.

Referring to FIGS. 10 and 11, only the items necessary for processing are explained, and those not required for processing will not be discussed where appropriate.

First to be analyzed is anchor information (shown as "anchor volume descriptor pointer") in the structure element "Anchor-1" having logical sector No. 256 indicated by the encircled number 1 in FIG. 10. The analysis provides the location of "volume descriptor sequence" indicated by the encircled number 2. To be analyzed next is "volume descriptor sequence" having logical sector Nos. 32 through 47 and indicated by the encircled number 2. The "volume descriptor sequence" includes: "primary volume descriptor," "implementation use volume descriptor," "partition descriptor," "logical volume descriptor," "unallocated space descriptor," "terminating descriptor," and "trailing logical sectors." The "primary volume descriptor" contains information about volume identification, "implementation use volume descriptor" about interchangeability, "partition descriptor" about partition identification, "logical volume descriptor" about the locations of logical partitions, "unallocated space descriptor" about unallocated spaces, "terminating descriptor" about the terminating location of the area, and "trailing logical sectors" about remaining areas.

Out of such information, three locations are acquired: the location of "logical volume integrity sequence" described by "logical volume descriptor" having logical sector No. 35 and indicated by the encircled number 3 in FIG. 10; the location of the target partition; and the location of "file set descriptor" inside the partition of interest.

Thereafter, "logical volume integrity sequence" having logical sector No. 48 and indicated by the encircled number 4 is analyzed for a check on volume information integrity. If the integrity is found intact, then the inside of the partition for "file structure and files" having LSN 272 through LSN all-272 and indicated by the encircled number 5 is analyzed. The steps above make it possible to start gaining access to the target partition.

Root information is stored in "file set descriptor" having logical block No. (A+1) and indicated by the encircled number 11 in FIG. 11. That root information is analyzed so as to acquire the location of the file entry (indicated as FE (root directory) in FIG. 11) having logical block No. (A+3) and indicated by the encircled number 12.

Acquisition of the file entry location is followed by an analysis of the file entry of the root directory (indicated as FE (root directory) in FIG. 11) having logical block No. (A+3) and indicated by the encircled number 12. The analysis permits acquisition of the location at which root directory information is stored (LBN=A+4). What follows next is an analysis of FID (file identifier descriptor) for the BDMV directory found in the root directory information and indicated by the encircled number 13. This provides acquisition of the location of the file entry (FE)(LBN=A+5; indicated as FE (BDMV) in FIG. 11) for the BDMV directory denoted by the encircled number 14.

Acquisition of the file entry location regarding the BDMV directory and indicated by the encircled number 14 is followed by an analysis of the file entry for the BDMV directory. This provides acquisition of the location (LBN=A+9) at which BDMV directory information is recorded.

Then the BDMV directory information is acquired, followed by an analysis of "file identifier descriptor" for the "Unit_Key_Gen_Value.inf" file in the BDMV directory as indicated by the encircled number 15. The analysis permits acquisition of the file entry location for the "Unit_Key_Gen_Value.inf" file. With the file entry location acquired for the "Unit_Key_Gen_Value.inf" file, the file entry for the "Unit_Key_Gen_Value.inf" file is analyzed as indicated by the encircled number 16. The analysis provides the location at which data about the "Unit_Key_Gen_Value.inf" file are recorded. Then access is obtained to the address at which the data about the "Unit_Key_Gen_Value.inf" file are recorded, whereby the target data are acquired. The foregoing steps permit acquisition of the data about the "root/BDMV/Unit_Key_Gen_Value.inf" file indicated by the encircled number 17.

As shown in FIGS. 10 and 11, the conventional UDF framework does not offer arrangements by which to acquire data of the files constituting a specific group (e.g., gathered block) more quickly than data of general files. The files involved are likely to have their file entries and their bodies recorded at scattered addresses on the storage medium. In that case, if it is desired to read a plurality of files at the same time, it will take a lot of time to acquire the corresponding bodies of data. Where files are retained under directories in multiple layers, gaining access to a desired file under a given directory can be a laborious process. To reach the next-lower directory from the current layer in search of the target file requires acquiring and analyzing three kinds of information: a file identifier descriptor (FID), a file entry (FE), and directory information. The process involves gaining access to numerous locations.

According to this invention, files are arranged into groups for use by a file system not designed to acquire data in files of particular groups (e.g., in UDF format) more quickly than general files. The grouped files are managed collectively into gathered information for high-speed file access.

Described below with reference to the flowchart of FIG. 12 is a recording process performed by the recording/reproducing mechanism 22 in FIG. 2. In step S1, the file system information creating unit 62 establishes rules by which to arrange files into groups. The grouping rules may be those discussed above with reference to FIG. 3 or 5. The rules described in reference to FIG. 5 are adopted here for the ensuing description. However, this is not limitative of the invention. Other rules may also be used instead. Once adopted, the grouping rules are generally used continuously without change. It is thus possible to utilize fixed grouping rules whose information may be stored into and retrieved from a suitable memory, not shown.

In step S2, the file system information creating unit 62 controls the writing unit 73 so as to have the recording/reproducing block 53 allocating an empty "Gathered.inf" file in a sufficiently extensive area on the storage medium 81. More specifically, the file system information creating unit 62 sets somewhere on the storage medium 81 a dummy "Gathered.inf" file to which to write gathered information after file allocation has been established. At this point, it is possible to write a dummy file to a rewritable storage medium before overwriting the existing file with final data later on. However, this method cannot be used on the write-once medium. With the latter type of storage medium in use, a similarly effective process can be accomplished not by actually writing a dummy file to the write-once medium but by reserving a recordable area on that medium, so that no other file may be recorded to the reserved area.

Figure 13:
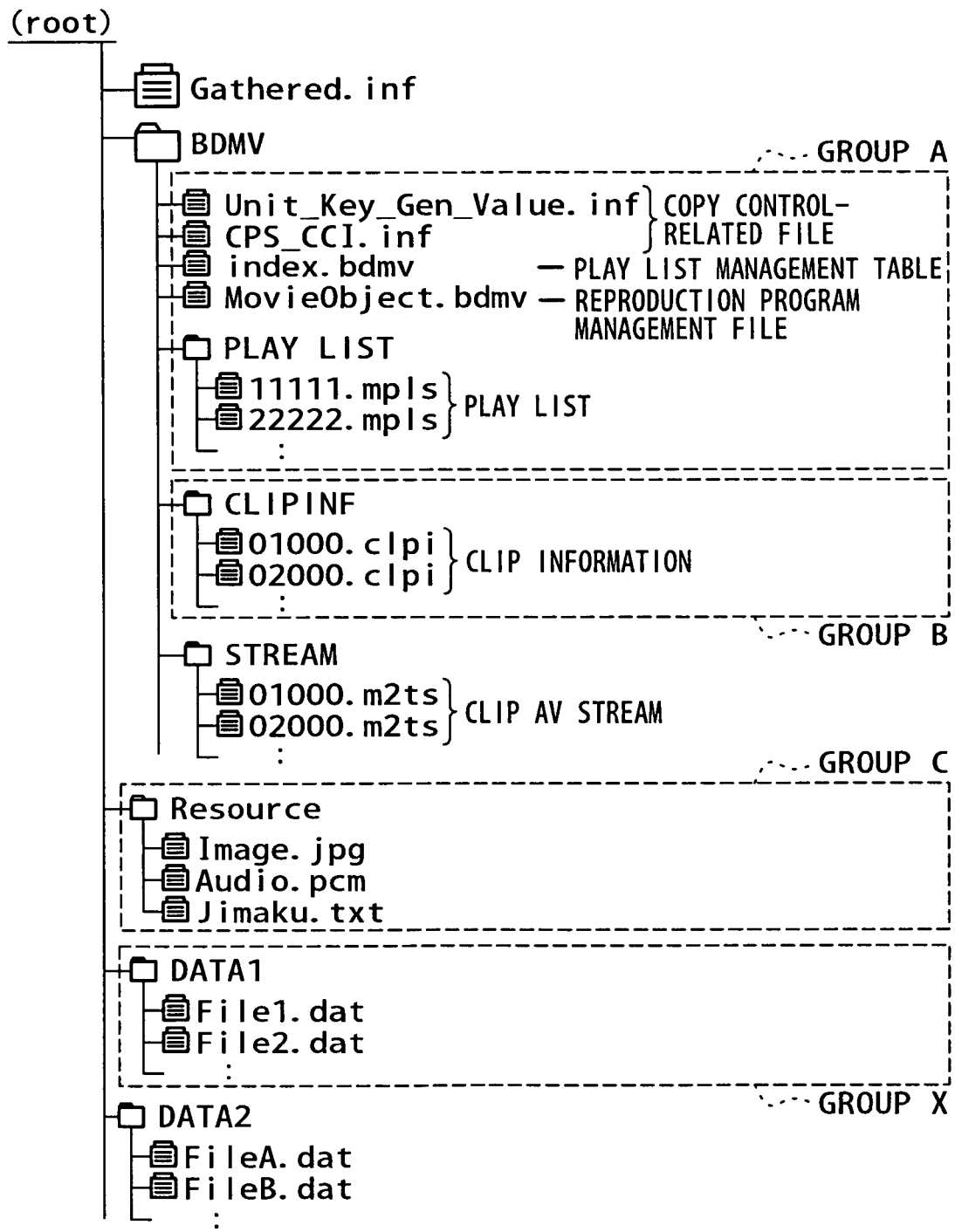
FIG. 13 is a schematic view sketching a typical structure of directories and files created under group management by the recording/reproducing mechanism in FIG. 2.

In step S3, the file system information creating unit 62 illustratively creates files and directories (i.e., something equivalent to the file structure in UDF format) immediately below the root directory, as shown in FIG. 13. For example, as depicted in FIG. 13, the file system information creating unit 62 creates immediately below the root directory a "Gathered.inf" file, a "BDMV" directory, a "Resource" directory, a "DATA1" directory, etc., along with relevant files under each of the directories. Since the structure in FIG. 13 is the same as that in FIG. 6 except for the "Gathered.inf" file, the structure will not be discussed further.

In step S4, the file system information creating unit 62 allocates all files of input data in keeping with the allocation rules for each group, and causes the recording/reproducing block 53 to write all allocated files to the storage medium 81, the input data having been input to the writing unit 73 through the ECC encoding unit 71 and modulating unit 72. At this point, the file system information creating unit 62 places allocation information about the written data into a memory, not shown.

Figure 14:
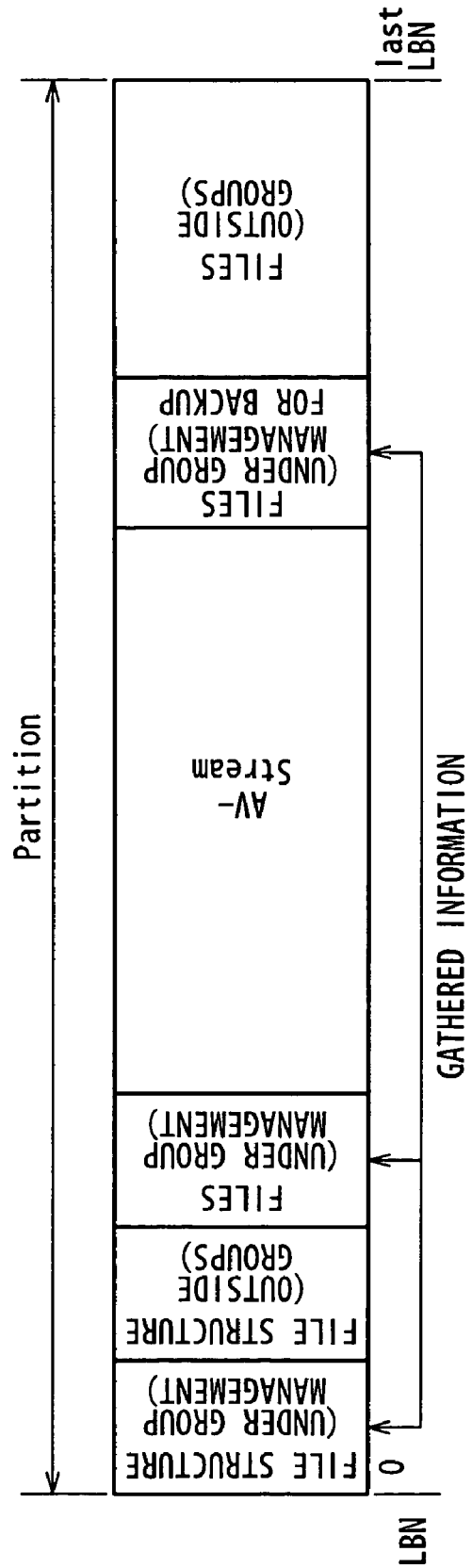
FIG. 14 is an explanatory view of typical allocation of data recorded onto the storage medium by the recording/reproducing mechanism in FIG. 2.

For example, all files are allocated according to the allocation rules shown in FIG. 14. In FIG. 14, the structure in effect prior to UDF version 2.01 is adopted. FIG. 14 indicates a typical allocation of recording areas in effect when gathered information is defined.

FIG. 14 presents a divided arrangement of recording areas including: a file structure for files under group management; a file structure for files not under group management; file bodies (indicated as "files (under group management)" in the figure) under group management; AV streams; backup files under group management (indicated as "Files Back Up"); and general data not under group management (indicated as "files (outside groups)"). Other suitable structures may be used alternatively, including one which involves a plurality of area divisions placed under group management. What is shown in FIG. 14 is a divided partition made up of the file structure for files under group management starting at LBN 0, followed by the file structure for files not under group management, file bodies under group management, AV streams, backup files under group management, and general data not under group management, in ascending order of LBN's.

In step S5, the file system information creating unit 62 reads the gathered information based on information held in the memory, not shown, and controls the writing unit 73 via the ECC encoding unit 71 and modulating unit 72 so as to have the recording/reproducing block 53 overwriting the existing "Gathered.inf" file on the storage medium 81 with the gathered information acquired. More specifically, with the allocation of FIG. 14 in effect, acquiring the gathered information involves reading the locations of the file structure for files under group management, file bodies under group management, AV streams, and backup files under group management. As a result, the file system information creating unit 62 creates the gathered information such as that shown in FIG. 15.

In FIG. 15, a group "G-Structure" stores $S_{St}$ and $E_{St}$ as a starting and an ending address respectively. Likewise, MainG-A stores $S_{MGA}$ and $E_{MGA}$ as a starting and an ending address; ResG-A stores $S_{RGA}$ and $E_{RGA}$ as a starting and an ending address; MainG-B stores $S_{MGB}$ and $E_{MGB}$ as a starting and an ending address; ResG-B stores $S_{RGB}$ and $E_{RGB}$ as a starting and an ending address; G-C stores $S_{GC}$ and $E_{GC}$ as a starting and an ending address; and G-X stores $S_{GX}$ and $E_{GX}$ as a starting and an ending address. That is, the files in G-Structure are recorded between the starting address $S_{St}$ and the ending address $E_{St}$. Similarly, the files in MainG-A are recorded between $S_{MGA}$ and $E_{MGA}$; the files in ResG-A between $S_{RGA}$ and $E_{RGA}$; the files in MainG-B between $S_{MGB}$ and $E_{MGB}$; the files in ResG-B between $S_{RGB}$ and $E_{RGB}$; the files in G-C between $S_{GC}$ and $E_{GC}$; and the files in G-X between $S_{GX}$ and $E_{GX}$.

The group "G-Structure" provides file structure information about the group management files represented by "File Structure" (under group management) shown in FIG. 14. The groups A, B, C and X accommodate grouped files to be allocated to "Files" (under group management) shown in FIG. 14.

The processes above write the "Gathered.info" file to the storage medium 81. Upon data retrieval, the structure of files under group management ("File Structure") and the relevant files are read from the "Gathered.inf" file and recognized as such. This permits high-speed data retrieval.

In the foregoing description, the grouping rules shown in FIG. 5 have been shown applied. However, the rules are not limited to those discussed above. Illustratively, "File Entry" in UDF format contains a field called a file type. While not used in arranging files into groups, the file type field may be defined anew for use as grouping ID's, much like those for BDFS-based allocation classes.

As another alternative, the data allocated under a specific directory may be handled as a single group. This requires separately recording a table that defines the relations between directories and groups.

Where this invention is limited in its use to a specific application, it is reasonable to expect that the standard in effect for that application defines the relations between files and groups. In such a case, there is no need to describe the relations between files and groups using a file system or particular tables. As long as the recording/reproducing apparatus is compatible with the application in question, the apparatus is supposed to determine automatically which files correspond to which group, so that grouped files can be retrieved collectively without any problem. In that case, groups 1 through N need only be defined illustratively to accommodate files to appreciate the same benefits discussed above.

Figure 16:
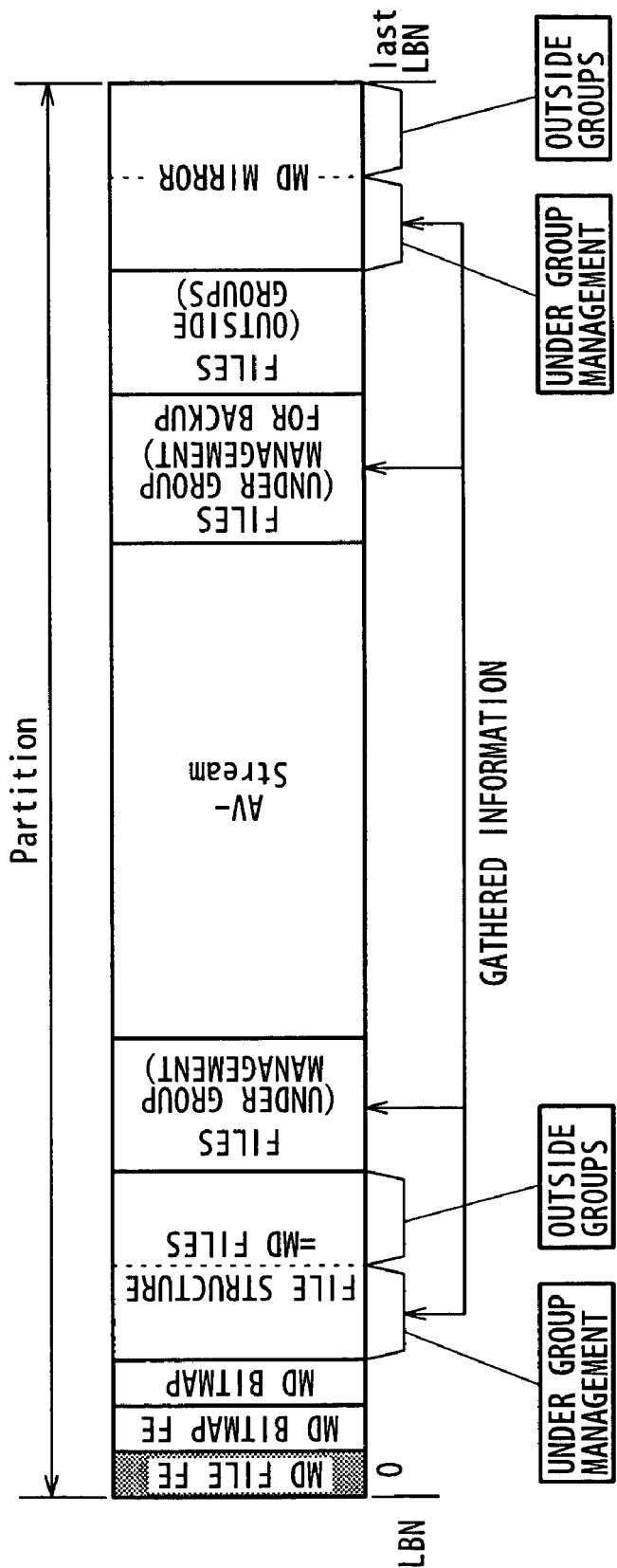
FIG. 16 is an explanatory view of another typical allocation of data recorded onto the storage medium by the recording/reproducing mechanism in FIG. 2.

The allocation rules shown in FIG. 14 may be replaced by those utilizing meta data partitions adopted by UDF version 2.50 and later as indicated in FIG. 16. Resorting to a meta data partition involves handling the file structure as a single file (e.g., meta data file ("MD files" in FIG. 16). The meta data partition method is intended to bypass the problem of prolonged access times. The problem has been attributed to the fact that the file structure was acquired for each directory and each file by the versions before 2.50. For applications in which some files are required to be managed in groups while others are not, it is desired to separate the portion of files placed under group management from the portion not under group management, even with regard to the files in the file structure handled collectively as a meta data file in the entire partition. For that reason, the gathered information defined as depicted in FIG. 16 should preferably be that which allows meta data files to be defined separately.

In FIG. 16, "MD (meta data) File FE (file entry)" contains MD file entry information that serves as the basis for recognizing the location of an MD file. "File Structure" contains meta data (MD) that record information about various management structures. The files in "File Structure" are divided into two portions, one under group management and the other outside groups. As indicated by "MD Mirror," "File Structure" further records redundant files for backup purposes. There are two kinds of "Files," those under group management and those outside groups. "Files" under group management further record redundant files for backup purposes.

In FIG. 16, the gathered information includes: a file structure formed by MD files and placed under group management, file bodies (indicated as "Files") under group management, backup files of the files under group management (indicated as "Files Back Up"), and MD mirror files under group management. Allocation information about the groups handled in the manner described is managed as the gathered information using the "Gathered.inf" file.

Figure 17:
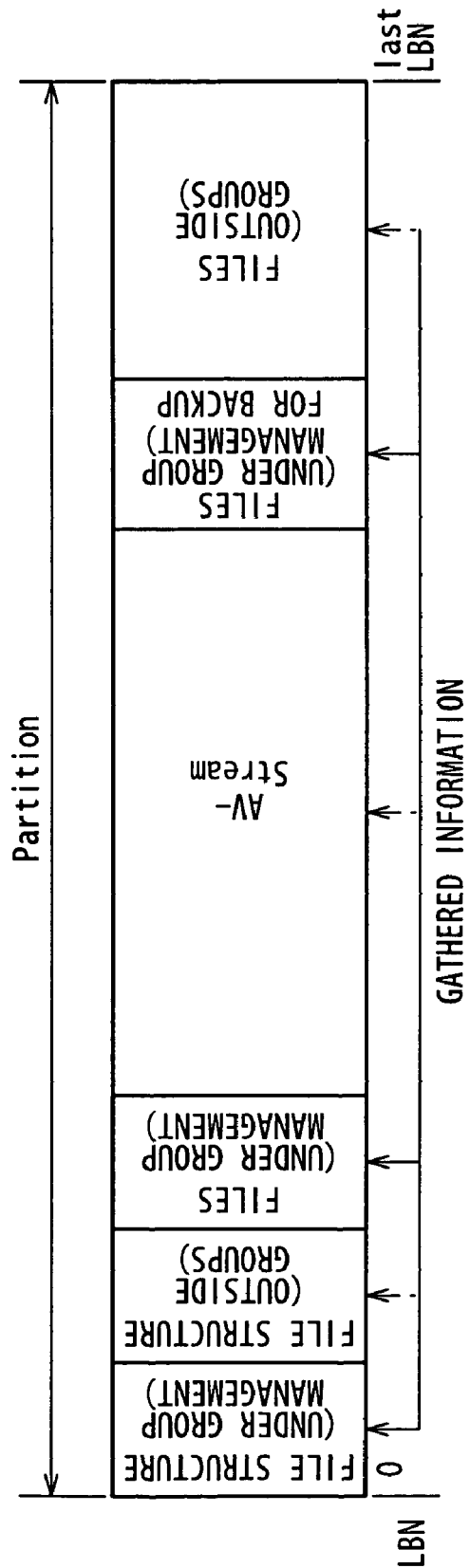
FIG. 17 is an explanatory view of still another typical allocation of data recorded onto the storage medium by the recording/reproducing mechanism in FIG. 2.

The gathered information is not limited to the file structure under group management, files under group management, and backup files under group management as shown in FIG. 14. Where necessary, as depicted in FIG. 17 (with broken lines), the gathered information may also be composed of a file structure not under group management, files not under group management, and backup files not under group management.

Figure 18:
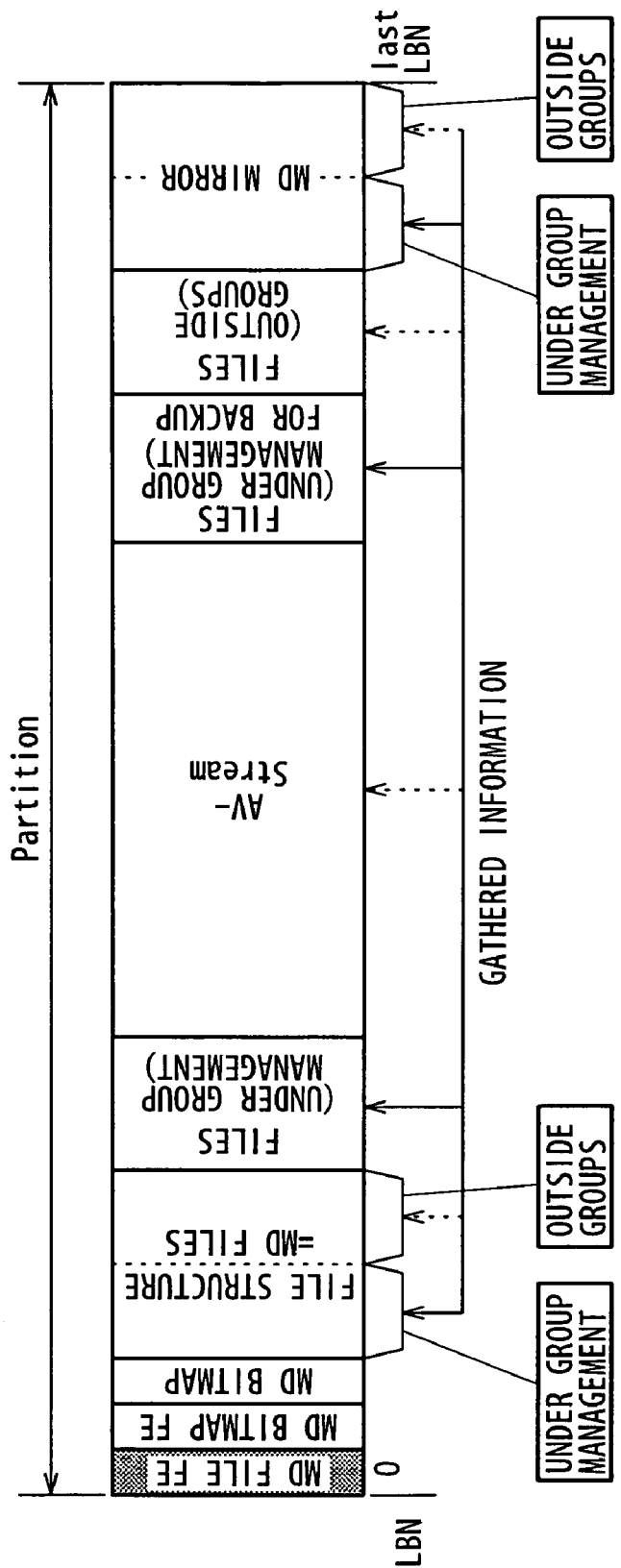
FIG. 18 is an explanatory view of yet another typical allocation of data recorded onto the storage medium by the recording/reproducing mechanism in FIG. 2.

Likewise, the gathered information is not limited to that portion of the file structure formed by MD files and placed under group management, files under group management (indicated as "Files"), backup files under group management (indicated as "Files Back Up"), and MD mirror files under group management. Alternatively, as illustrated in FIG. 18 (with broken lines), the gathered information may be composed of that portion of the file structure formed by MD files and not placed under group management, files not under group management (indicated as "Files (outside groups)"), AV streams, and MD mirror files not under group management.

Figure 19:
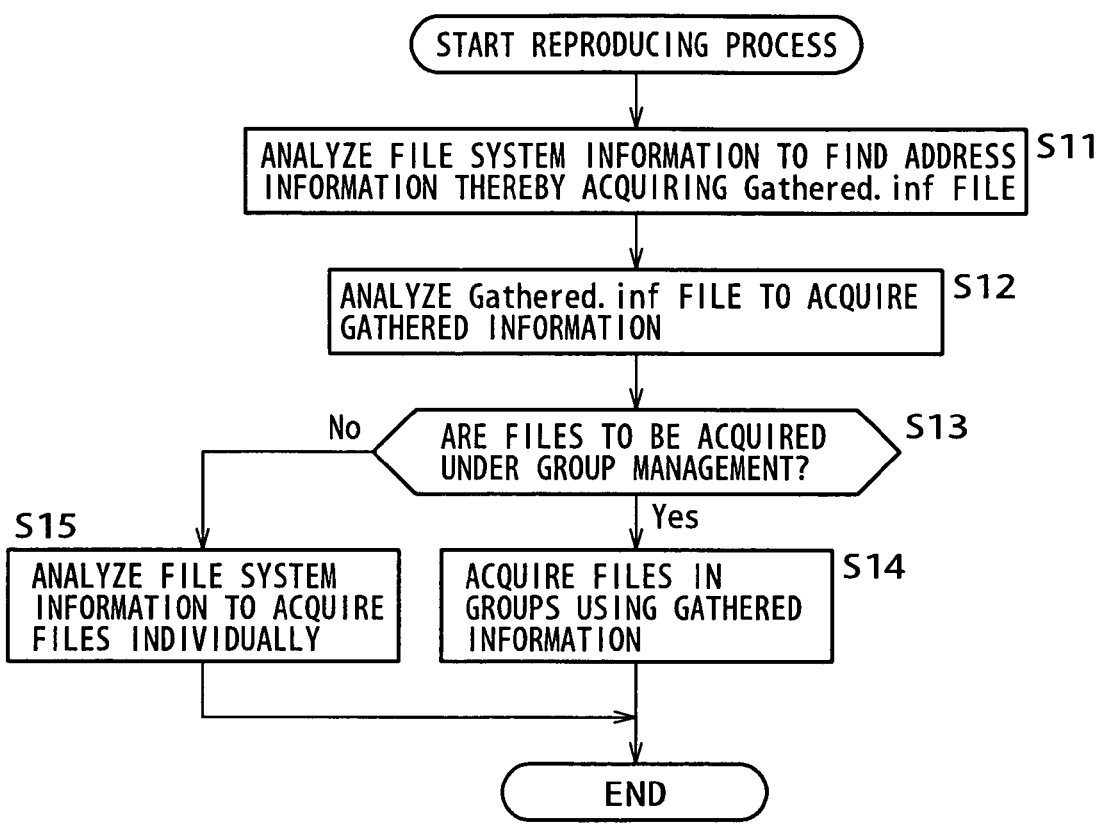
FIG. 19 is a flowchart of steps constituting a reproducing process performed by the recording/reproducing mechanism in FIG. 2.

Described below with reference to the flowchart of FIG. 19 is a typical process performed by the recording/reproducing mechanism 22 of FIG. 2 to reproduce information from the storage medium 81.

In step S11, the file system information recognizing unit 61 controls the reading unit 91 so as to have the recording/reproducing block 53 reading information from the storage medium 81 and to analyze file system information through the demodulating unit 92 and ECC decoding unit 93. Based on the acquired address information about the "Gathered.inf" file on the storage medium 81, the file system information recognizing unit 61 acquires the "Gathered.inf" file.

In step S12, the file system information recognizing unit 61 analyzes the acquired "Gathered.inf" file to obtain gathered information. Performing this step allows the file system information recognizing unit 61 to acquire the information such as that shown in FIG. 15 and thereby to recognize where the group management information is recorded on the storage medium 81.

In step S13, the file system information recognizing unit 61 determines whether the files to be acquired (i.e., to be reproduced) are under gathered management, i.e., whether they are under group control.

If in step S13 the files to be acquired are found to be under gathered management, step S14 is reached. In step S14, the file system information recognizing unit 61 controls the reading unit 91 based on the location information about the group to which the files belong, so as to have the recording/reproducing block 53 reading and acquiring all files belonging to the group in question from the storage medium 81.

If the files to be acquired are under group management, they belong to some group or groups. For example, if the target files belong to group A subject to the grouping rules in FIG. 5, the locations in which the target files are recorded are found to be between address $S_{MGA}$ and address $E_{MGA}$ on the storage medium 81 according to the gathered information shown in FIG. 15. The files belonging to group A are thus read out collectively based on the gathered information.

If in step S13 the target files are not found to be under gathered management (i.e., if the files are not under group management), then step S15 is reached. In step S15, the file system information recognizing unit 61 analyzes the file system information thereby to acquire the target files individually.

In the foregoing steps, if the files to be acquired are found to be under group management, the other files contained in the same group are often needed at the same time. In that case, reading these files collectively as a group based on the gathered information permits more efficient data retrieval than searching for and reading the files individually. That in turn translates into high-speed data retrieval (i.e., high-speed data reproduction).

In the above description, the "Gathered.inf" file was shown to be acquired based on the address locations obtained from the file system information. Alternatively, the "Gathered.inf" file may be recorded to fixed addresses on the storage medium 81. This allows the "Gathered.inf" file to be acquired without obtaining the file system information.

Figure 20:
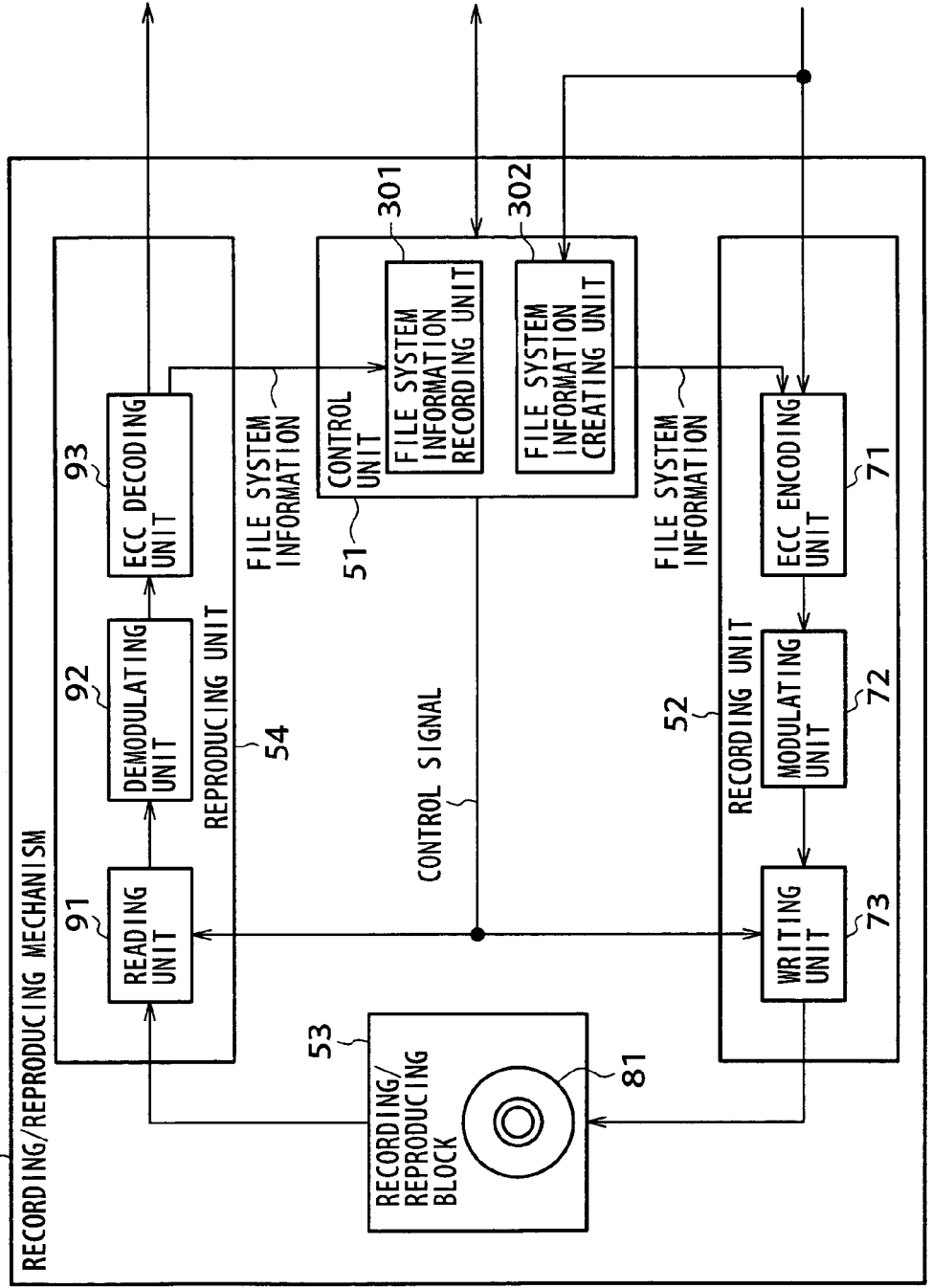
FIG. 20 is a block diagram illustrating another typical structure of the recording/reproducing mechanism included in FIG. 1.

FIG. 20 is a block diagram illustrating another typical structure of the recording/reproducing mechanism 22. This type of recording/reproducing mechanism 22 records the "Gathered.inf" file to fixed addresses on the storage medium 81 so that the "Gathered.inf" file may be acquired directly without obtaining the file system information. In FIG. 20, those components with their counterparts already shown in FIG. 2 are given the same reference numerals, and the descriptions of such components are omitted where they are redundant.

Figure 2:
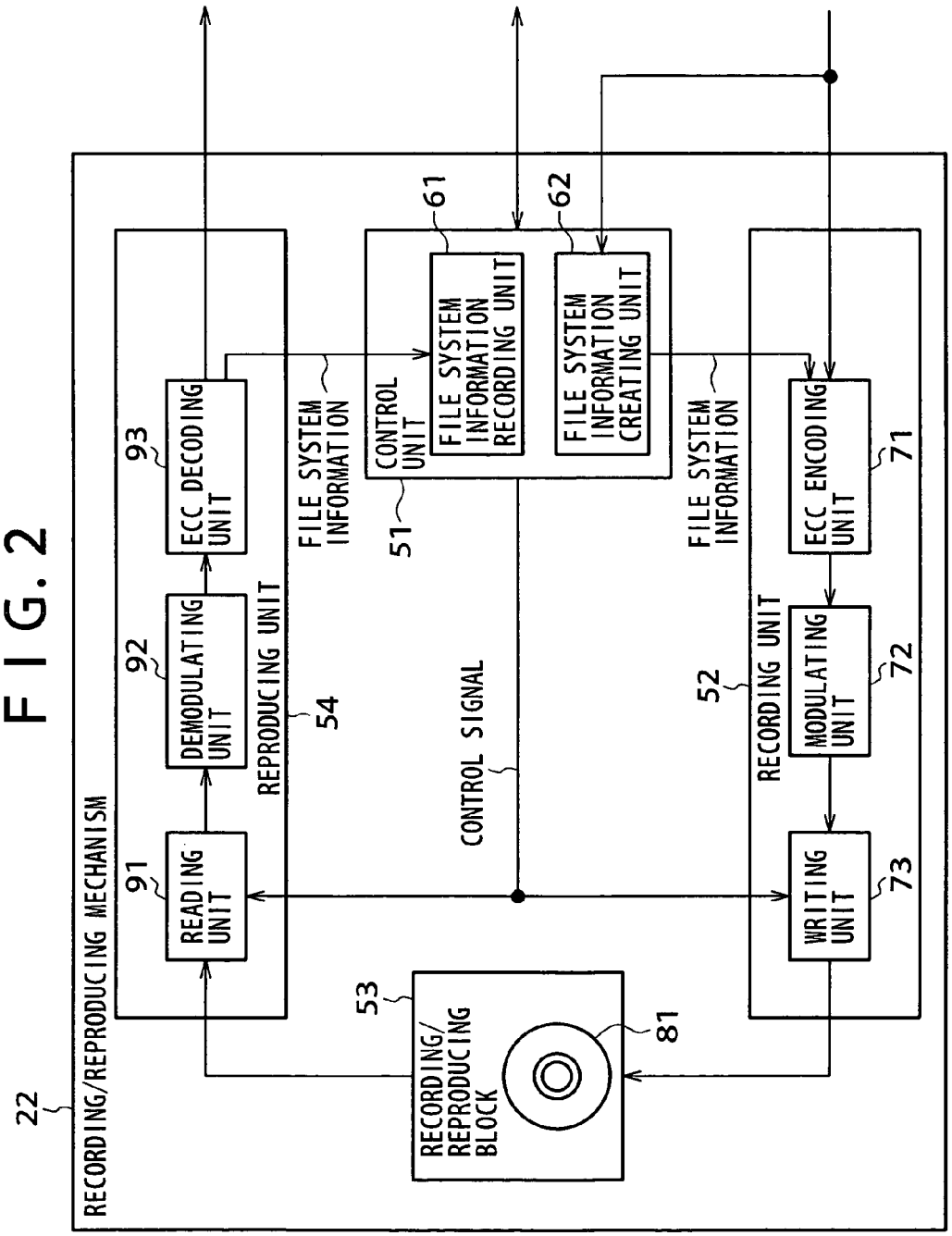
FIG. 2 is a block diagram illustrating a typical structure of a recording/reproducing mechanism included in FIG. 1.

What makes the recording/reproducing mechanism 22 in FIG. 20 different from its counterpart in FIG. 2 is that a file system information recognizing unit 301 and a file system information creating unit 302 replace the file system information recognizing unit 61 and file system information creating unit 62, respectively.

The file system information recognizing unit 301 basically has the same capabilities as the file system information recognizing unit 61. What characterizes the file system information recognizing unit 301 is its ability to read the "Gathered.inf" file from fixed addresses on the storage medium 81 without acquiring recorded addresses by analyzing the file system information.

The file system information creating unit 302 basically has the same capabilities as the file system information creating unit 62. What makes the file system information creating unit 302 different is its ability to record the "Gathered.inf" file to fixed addresses on the storage medium 81.

Figure 21:
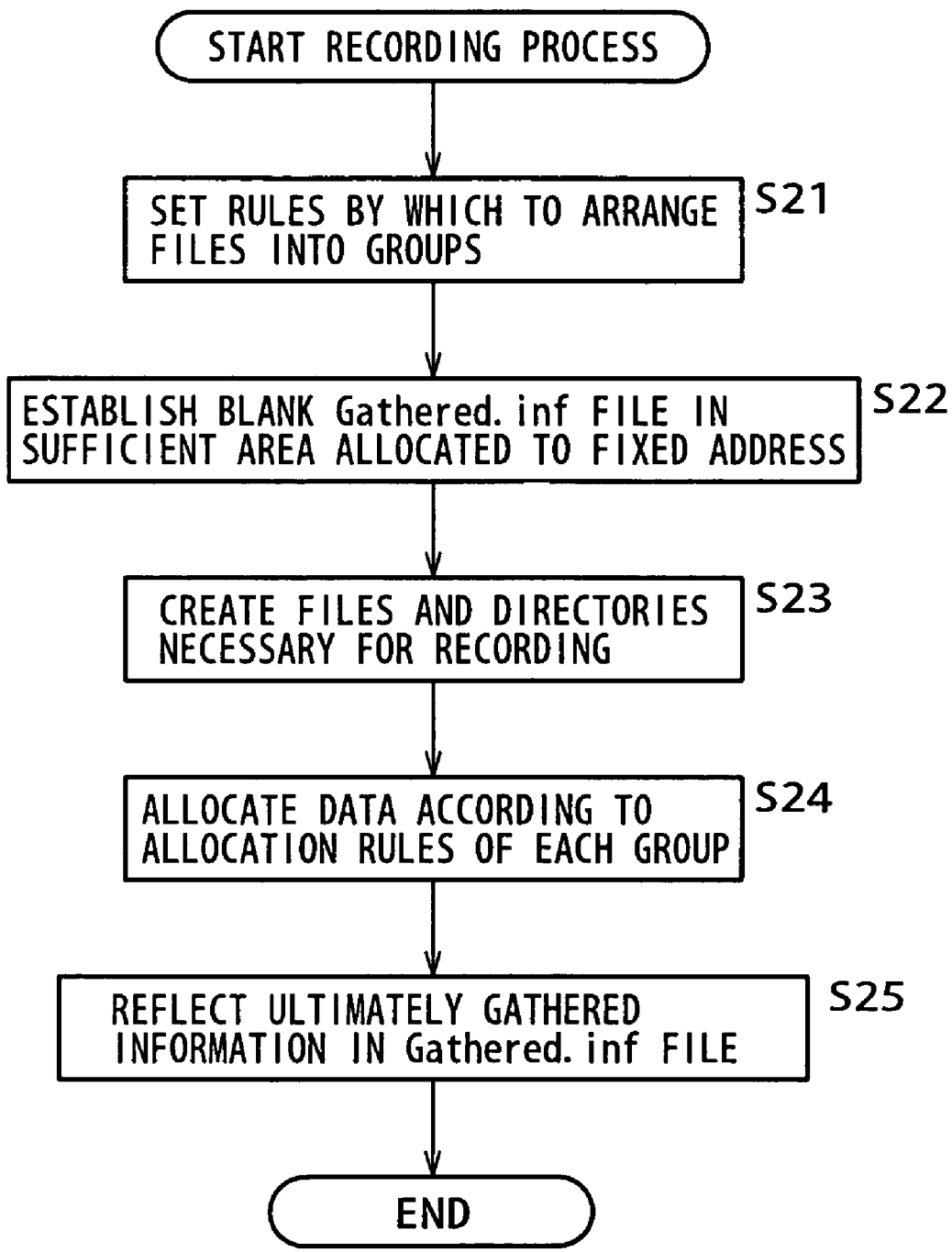
FIG. 21 is a flowchart of steps constituting a recording process performed by the recording/reproducing mechanism in FIG. 20.

Described below with reference to the flowchart of FIG. 21 is a recording process performed by the recording/reproducing mechanism 22 in FIG. 20. Steps S21 and S23 through S25 in FIG. 21 are equivalent to the above-described steps S1 and S3 through S5 in the flowchart of FIG. 12 and thus will not be discussed further.

In step S22, the file system information creating unit 302 controls the writing unit 73 so as to allocate a sufficiently extensive area in which to write an empty "Gathered.inf" file at fixed addresses on the storage medium 81. That is, the file system information creating unit 302 establishes a dummy "Gathered.inf" file at fixed addresses on the storage medium 81, the file being used to accommodate gathered information after file allocation has been finalized.

The process above records the "Gathered.inf" file to fixed addresses on the storage medium 81. That means the "Gathered.inf" file can be acquired at the time of reproduction without verifying the location of that file in accordance with the file system information. This translates into data retrieval at higher speed.

Figure 22:
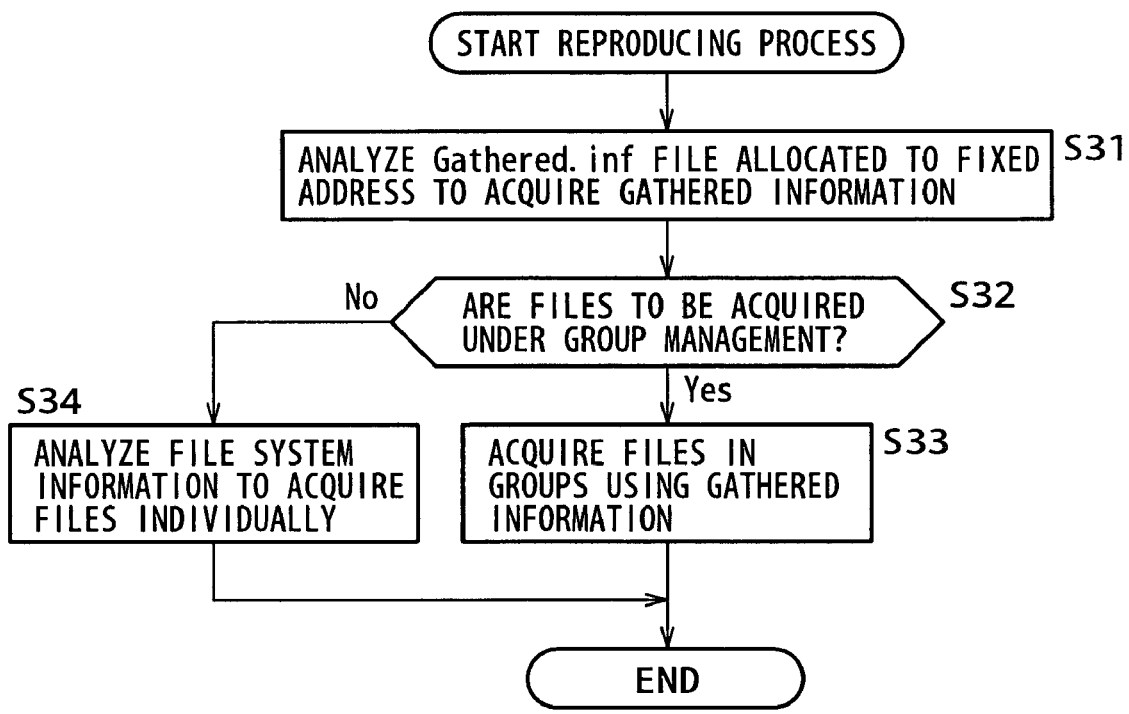
FIG. 22 is a flowchart of steps constituting a reproducing process performed by the recording/reproducing mechanism in FIG. 20.

Described below with reference to the flowchart of FIG. 22 is a reproducing process performed by the recording/reproducing mechanism 22 in FIG. 20. Steps S32 through S34 in FIG. 22 are equivalent to the above-described steps S13 through S15 in the flowchart of FIG. 19 and thus will not be discussed further.

In step S31, the file system information recognizing unit 301 causes the writing unit 91 to have the recording/reproducing block 53 reading the "Gathered.inf" file from fixed addresses on the storage medium 81. By analyzing the file thus retrieved, the unit 301 acquires the gathered information.

The process above eliminates the need for carrying out step S11 in the flowchart of FIG. 19. This makes it possible to acquire the target files at a higher speed than before and thereby to bring about appreciably quicker data retrieval in combination with the group management of files for high-speed file read-out.

The foregoing description has shown how the files under group management and the files and directories not subject to group management are managed in a single partition on the storage medium 81. Alternatively, there may be provided two partitions, one in which the files under group management are recorded and the other in which the files not placed under group management are recorded, whereby the grouped files are managed in one particular partition.

It is also possible to allocate a dedicated partition for each group or for each set of multiple groups. Allocation of the partition for each group (or for each set of groups) to be read out collectively at high speed is brought about alternatively by enabling partition-specific area allocation information described in "Volume Structure" in UDF format to replace the gathered information traditionally recorded in the form of the "Gathered.inf" file in the user data area. That is, where the method to be described below is in use, it is not mandatory to record the gathered information as a specific file in the user data area.

Figure 23:
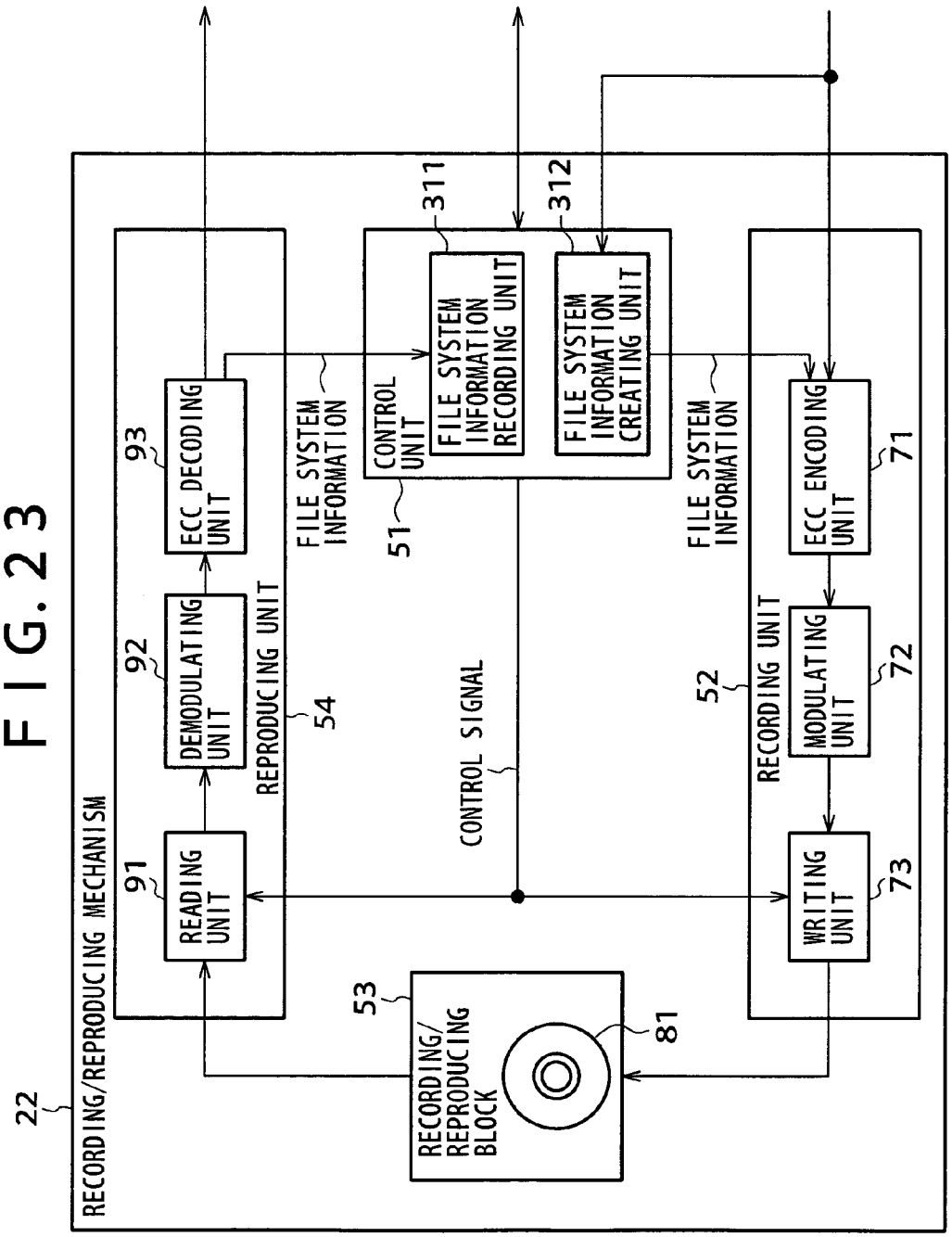
FIG. 23 is a block diagram showing still another typical structure of the recording/reproducing mechanism included in FIG. 1.

FIG. 23 is a block diagram showing another typical structure of the recording/reproducing mechanism 22. This type of recording/reproducing mechanism 22 uses two partitions on the storage medium 81, one in which files under group management are recorded and the other in which files not subject to group management are recorded, whereby the grouped files are managed in a single partition. In FIG. 23, those components of the recording/reproducing mechanism 22 with their counterparts already shown in FIG. 2 are given the same reference numerals, and the descriptions of such components are omitted where they are redundant.

What makes the recording/reproducing mechanism 22 in FIG. 23 different from its counterpart in FIG. 2 is that a file system information recognizing unit 311 and a file system information creating unit 312 replace the file system information recognizing unit 61 and file system information creating unit 62, respectively.

The file system information recognizing unit 311 basically has the same capabilities as the file system information recognizing unit 61. What characterizes the file system information recognizing unit 311 is its ability to read (i.e., reproduce) files under group management from the partition in which the grouped file are recorded, and to read (i.e., reproduce) files not placed under group management from the partition in which the files not subject to group management are recorded, on the storage medium 81.

The file system information creating unit 312 basically has the same capabilities as the file system information creating unit 62. What makes the file system information creating unit 312 different is its ability to establish two partitions and to record files under group management in one of the partitions and files not subject to group management in the other partition on the storage medium 81.

Figure 24:
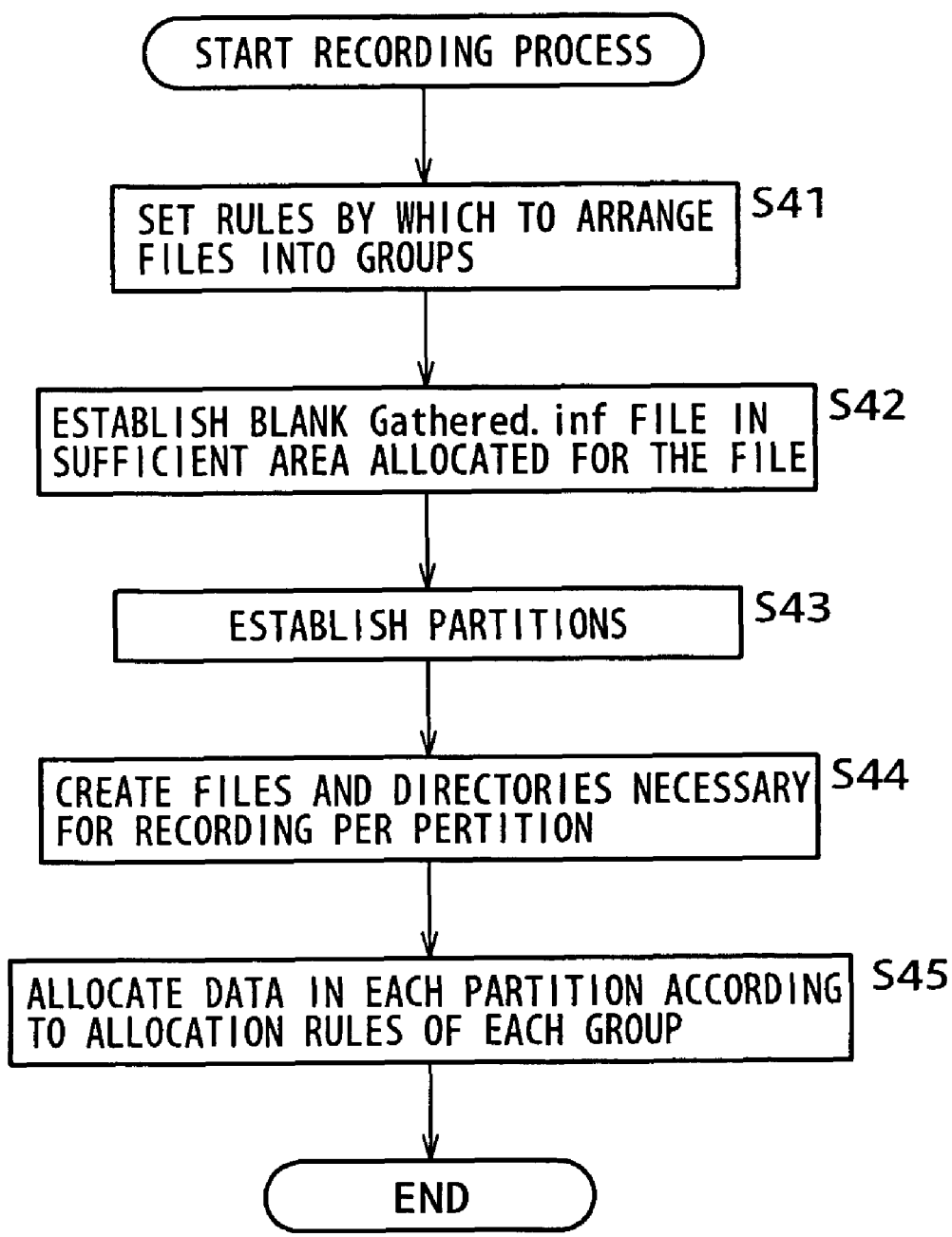
FIG. 24 a flowchart of steps constituting a recording process performed by the recording/reproducing mechanism in FIG. 23.

Described below with reference to the flowchart of FIG. 24 is a recording process performed by the recording/reproducing mechanism 22 in FIG. 23. Steps S41, S42 and S46 in FIG. 24 are equivalent to the above-described steps S1, S2 and S5 in the flowchart of FIG. 12 and thus will not be discussed further.

In step S43, the file system information creating unit 312 controls the writing unit 73 so as to have the recording/reproducing block 53 establishing at least two partitions on the storage medium 81. In this example, two partitions 1 and 2 are set up.

In step S44, the file system information creating unit 312 creates files and directories (corresponding to "File Structure" in UDF format) under group management in one partition, and files and directories not subject to group management in another partition. Illustratively, as shown in FIG. 25, the file system information creating unit 312 creates the files and directories under group management in partition 1, and the files and directories not subject to group management in partition 2.

Figure 25:
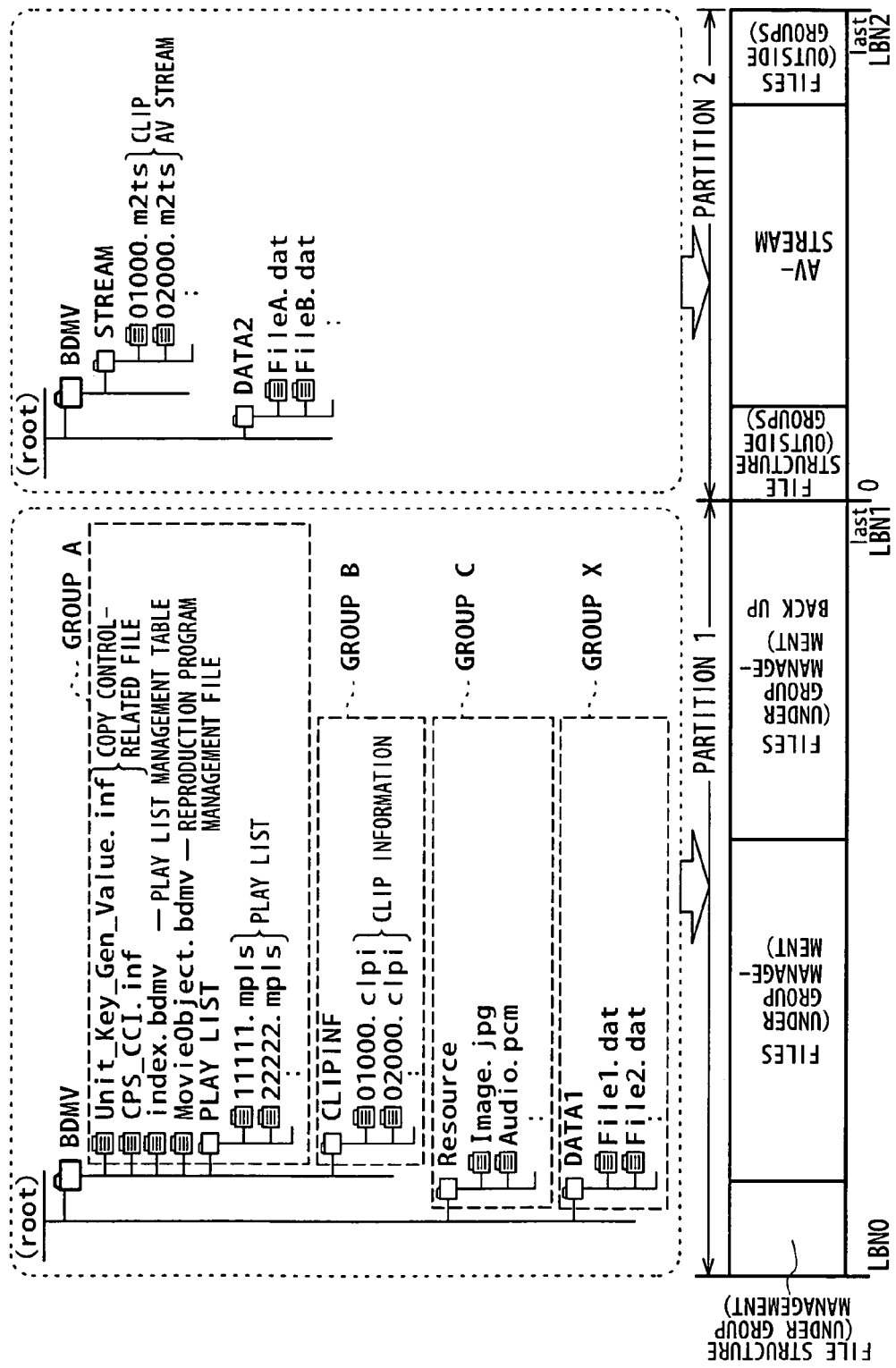
FIG. 25 is an explanatory view of a typical directory structure per partition for use in the recording process performed by the recording/reproducing mechanism in FIG. 23.

The makeup in FIG. 25 is created in accordance with the grouping rules in FIG. 5. Specifically, a "PLAYLIST" directory for group A, a "CLIPINF" directory for group B, a "Resource" directory for group C, and a "DATA1" directory for group X are created in partition 1, together with files subsumed under each directory, all these groups being placed under group management. A "STREAM" directory and a "DATA2" directory not subject to group management are created in partition 2, along with files subsumed under the two directories.

In step S45, the file system information creating unit 312 allocates all files of input data in keeping with the allocation rules for each group in each partition, and causes the recording/reproducing block 53 to write all allocated files to the storage medium 81, the input data having been input to the writing unit 73 through the ECC encoding unit 71 and modulating unit 72. At this point, the file system information creating unit 312 places allocation information about the written data into the memory, not shown.

Figure 26:
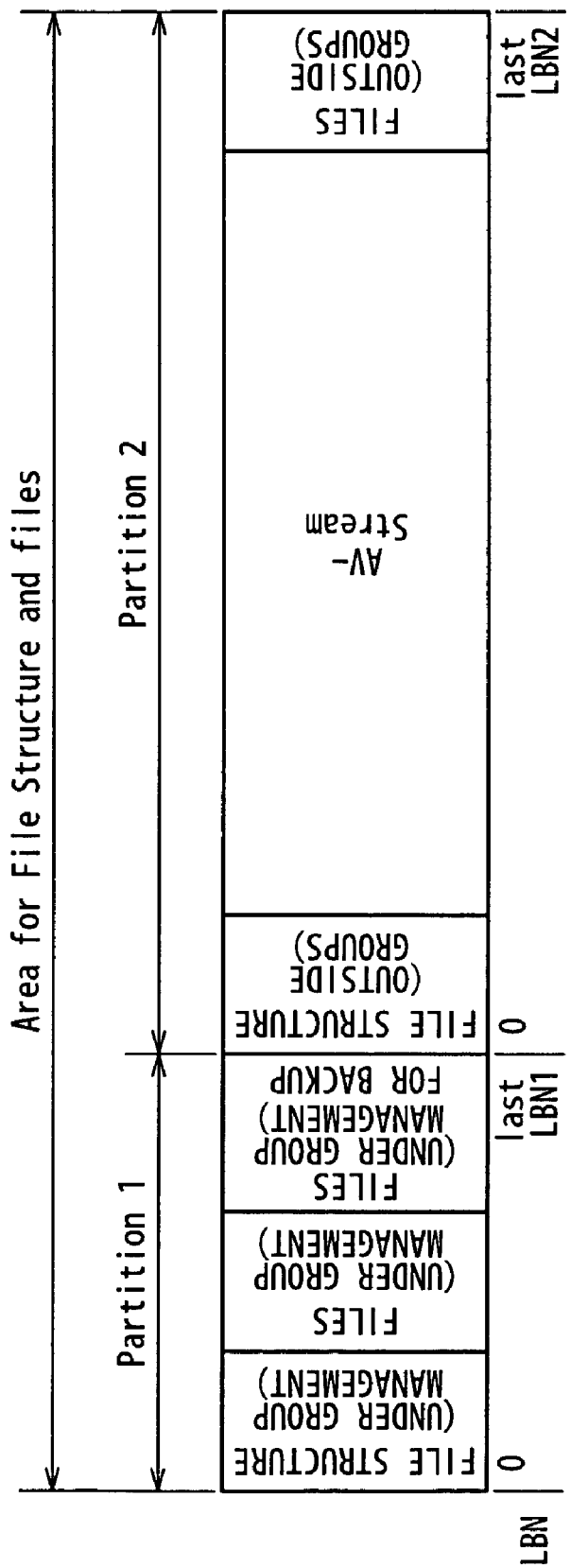
FIG. 26 is an explanatory view of typical allocation of data recorded onto the storage medium by the recording/reproducing mechanism in FIG. 23.

For example, all files are allocated in accordance with the allocation rules depicted in FIG. 26. FIG. 26 shows a file structure for files under group management, file bodies (indicated as "Files" in the figure) under file management, and backup data for files under group management (indicated as "Files Back Up"), all recorded in partition 1. Also shown are a file structure for files not under group management, AV streams (indicated as "AV-Stream"), and general data (indicated as "Files") not subject to group management, all recorded in partition 2.

If the files under group management and the files not subject to group management are handled in different partitions as described above and if it is desired to read continuous information managed in files constituting groups, then it is possible to retrieve continuously all relevant files under group management in a single access pass. This feature enables high-speed data retrieval.

Figure 27:
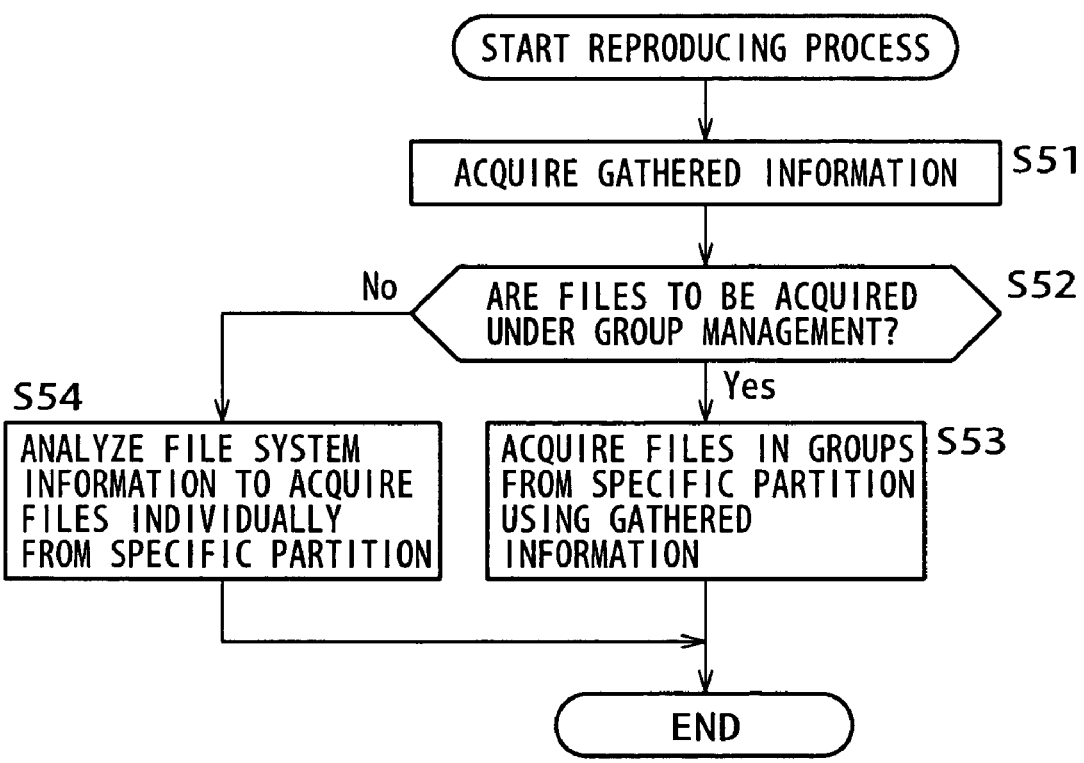
FIG. 27 is a flowchart of steps constituting a reproducing process performed by the recording/reproducing mechanism in FIG. 23.

Described below with reference to the flowchart of FIG. 27 is a reproducing process performed by the recording/reproducing mechanism 22 in FIG. 23. In step S51, the file system information recognizing unit 311 acquires gathered information established by the file system information creating unit 312 at the time of recording, i.e., information indicating that the group management file is recorded in partition 1. Step S52 in FIG. 27 is equivalent to the above-described step S13 in the flowchart of FIG. 19 and thus will not be discussed further.

In step S53, the file system information recognizing unit 311 controls the reading unit 91 based on group location information in the gathered information acquired, the location information indicating the location of the group to which the files to be acquired are known to belong. In controlling the reading unit 91 this way, the file system information recognizing unit 311 causes the recording/reproducing block 53 to read and acquire all files that belong to the group in question from the particular partition in which the directories and files under group management are recorded on the storage medium 81.

More specifically, if what is represented by FIGS. 25 and 26 is in effect and if the files to be acquired are under group management, then the target files are expected to be found in partition 1. In that case, the gathered information is used as the basis for determining the group to which the files in question belong and for collectively reading the files of that group.

In step S54, the file system information recognizing unit 311 analyzes the file system information and thereby acquires the target files individually from directories and files not subject to group management. In this case, the file system information recognizing unit 311 controls the reading unit 91 based on group location information in the file system information thus acquired, the location information indicating the location of the group to which the files to be acquired are known to belong. In controlling the reading unit 91 this way, the file system information recognizing unit 311 causes the recording/reproducing block 53 to read and acquire the target files that belong to the group in question from partition 2 in which the directories and files not placed under group management are recorded on the storage medium 81.

In the manner described, the files under group management and the files not subject to group management are handled in different partitions. In that setup, if it is desired to retrieve continuous information managed in groups, the recording/reproducing block 53 reads all relevant files under group management from the storage medium 81 in a single access pass. This provides high-speed data retrieval.

The foregoing description has shown that the gathered information ("Gathered.inf" file) is written to a general recording area (i.e., user data area) and that a dedicated partition is allocated for the files under group management. Alternatively, the "Gathered.inf" file may be written to a physical area (e.g., lead-in area).

Figure 28:
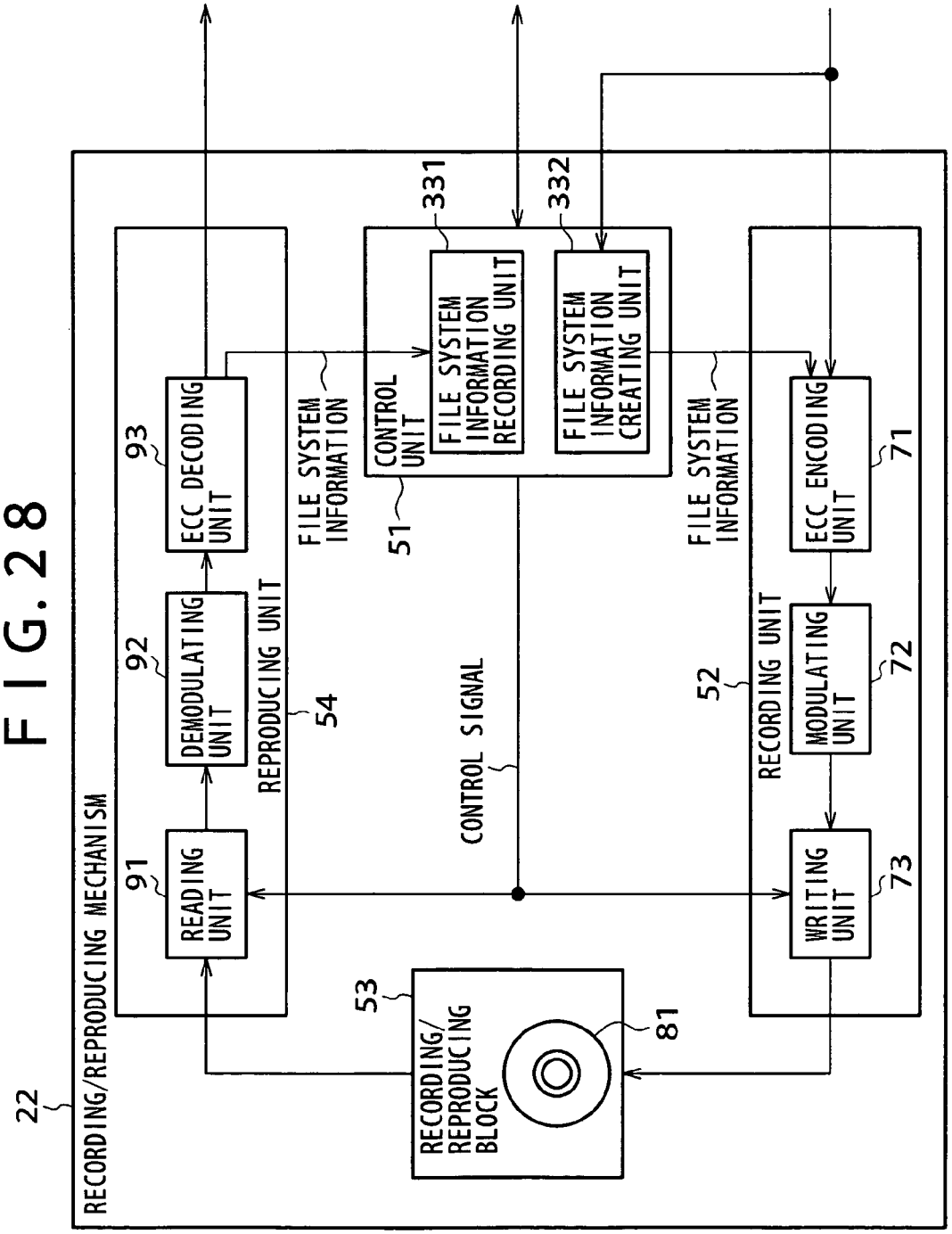
FIG. 28 is a block diagram showing yet another typical structure of the recording/reproducing mechanism included in FIG. 1.

FIG. 28 is a block diagram showing another typical structure of the recording/reproducing mechanism 22. This type of recording/reproducing mechanism 22 writes gathered information to a physical area on the storage medium 81 and reads the file of the gathered information from the physical area. In FIG. 28, those components of the recording/reproducing mechanism 22 with their counterparts already shown in FIG. 2 are given the same reference numerals, and the descriptions of such components are omitted where they are redundant.

What makes the recording/reproducing mechanism 22 in FIG. 28 different from its counterpart in FIG. 2 is that a file system information recognizing unit 331 and a file system information creating unit 332 replace the file system information recognizing unit 61 and file system information creating unit 62, respectively.

The file system information recognizing unit 331 basically has the same capabilities as the file system information recognizing unit 61. What characterizes the file system information recognizing unit 331 is that it controls the reading unit 91 so as to read gathered information that has been written to a physical area on the storage medium 81 by the file system information creating unit 332.

The file system information creating unit 332 basically has the same capabilities as the file system information creating unit 62. What makes the file system information creating unit 332 different is that it controls the writing unit 73 so as to write the gathered information to the physical area on the storage medium 81.

Figure 29:
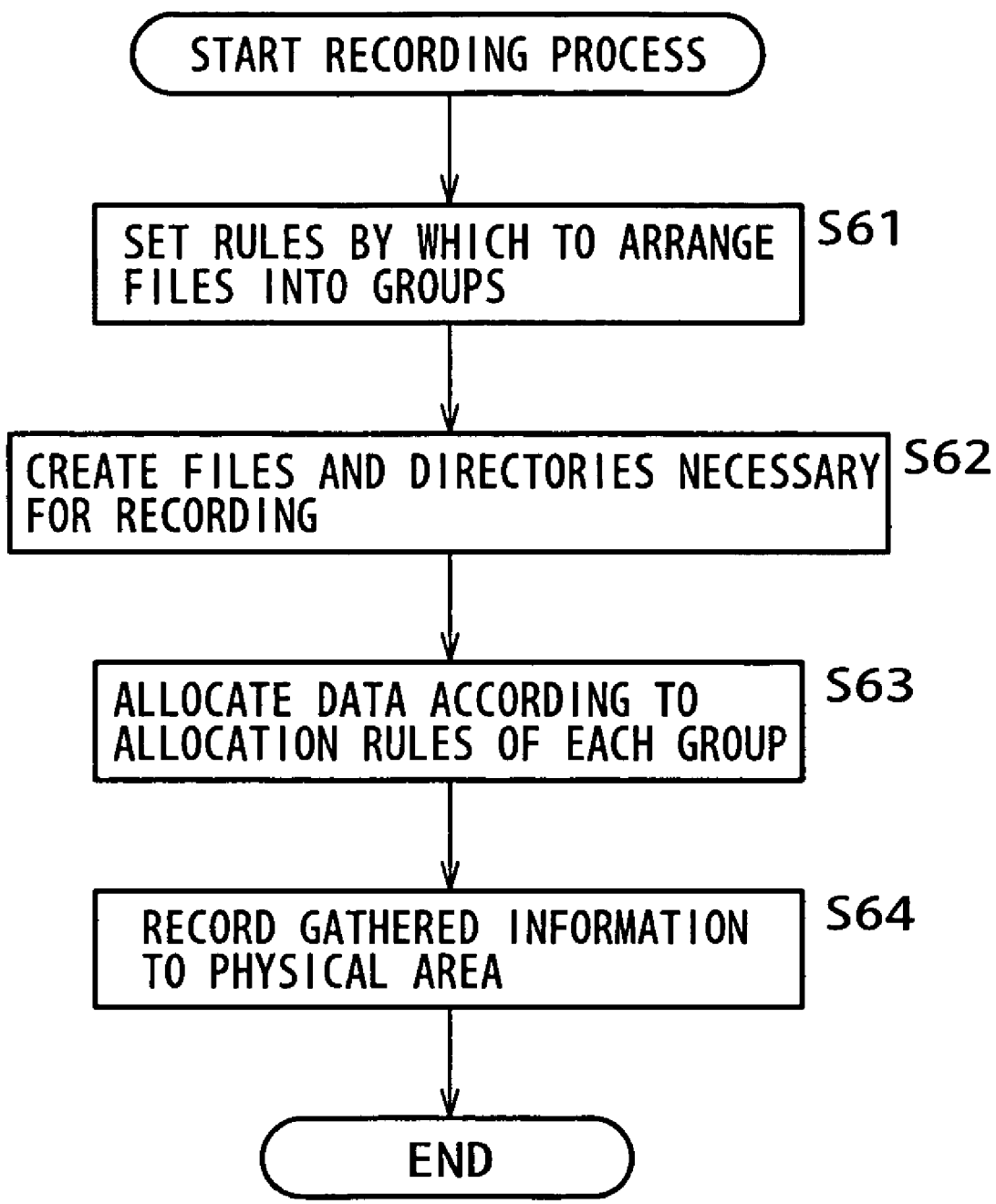
FIG. 29 is a flowchart of steps constituting a recording process performed by the recording/reproducing mechanism in FIG. 28.

Described below with reference to the flowchart of FIG. 29 is a recording process performed by the recording/reproducing mechanism 22 in FIG. 28. Steps S61 through 63 in FIG. 29 are equivalent to the above-described steps S1, S3 and S4 in the flowchart of FIG. 12 and thus will not be discussed further.

Figure 30:
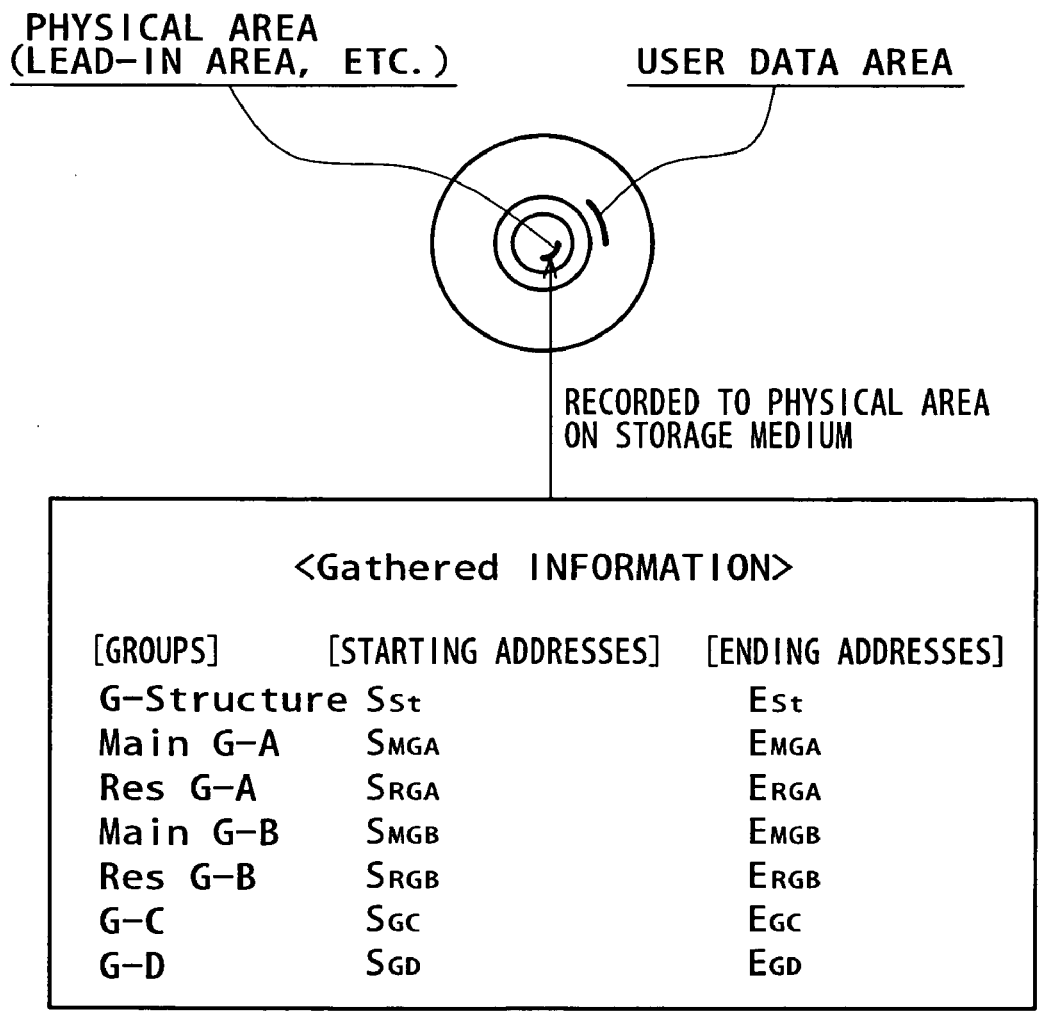
FIG. 30 is an explanatory view showing how information is recorded to a physical area on the storage medium by the recording/reproducing mechanism in FIG. 28.

In step S64, the file system information creating unit 332 controls the writing unit 73 so as to have the recording/ reproducing block 53 writing the gathered information to the physical area on the storage medium 53, as shown in FIG. 30.

That is, as illustrated in FIG. 30, the physical area accommodates the gathered information which, in other examples, has been recorded as the "Gathered.inf" file to the user data area along with other data.

The process above writes the gathered information to the physical area as part of the information to be read first from that area at the time of retrieving information from the storage medium 81. It is thus possible to acquire the gathered information at the time of reproduction without verifying the location of the "Gathered.inf" file based on the file system information. This translates into data retrieval at higher speed.

Figure 31:
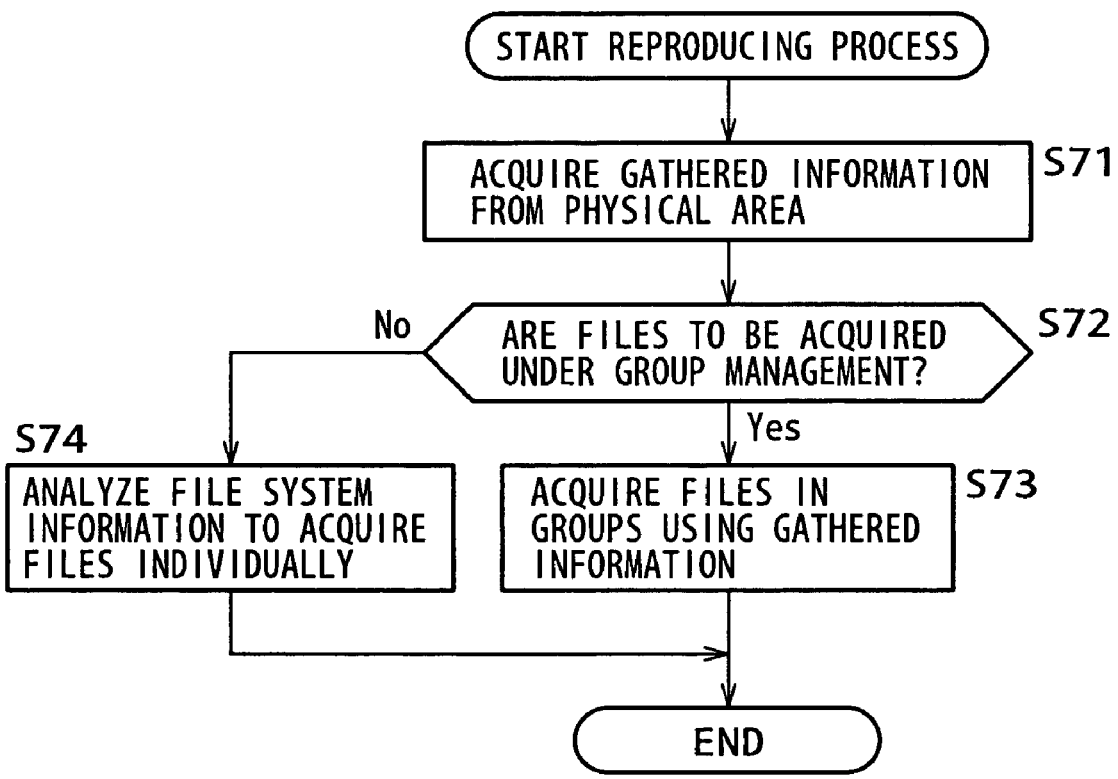
FIG. 31 is a flowchart of steps constituting a reproducing process performed by the recording/reproducing mechanism in FIG. 28.

Described below with reference to the flowchart of FIG. 31 is a reproducing process performed by the recording/reproducing mechanism 22 in FIG. 28. Steps S72 through 74 in FIG. 31 are equivalent to the above-described steps S13 through S15 in the flowchart of FIG. 19 and thus will not be discussed further.

In step S71, the file system information recognizing unit 331 controls the reading unit 91 so as to have the recording/reproducing block 53 acquiring the gathered information recorded in the physical area on the storage medium 81 as shown in FIG. 30.

The process above acquires the gathered information at the time of reading information from the storage medium 81 without verifying the location of the "Gathered.inf" file based on the file system information. This contributes to boosting the speed of data retrieval.

The foregoing description has shown that the gathered information is recorded on the storage medium for group management under rules such as UDF not envisaging group management and that files are placed under group management using separate partitions. Alternatively, the gathered information may be written to the storage medium in keeping with the rules of UDF without recourse to the above-described "Gathered.inf" file.

Figure 32:
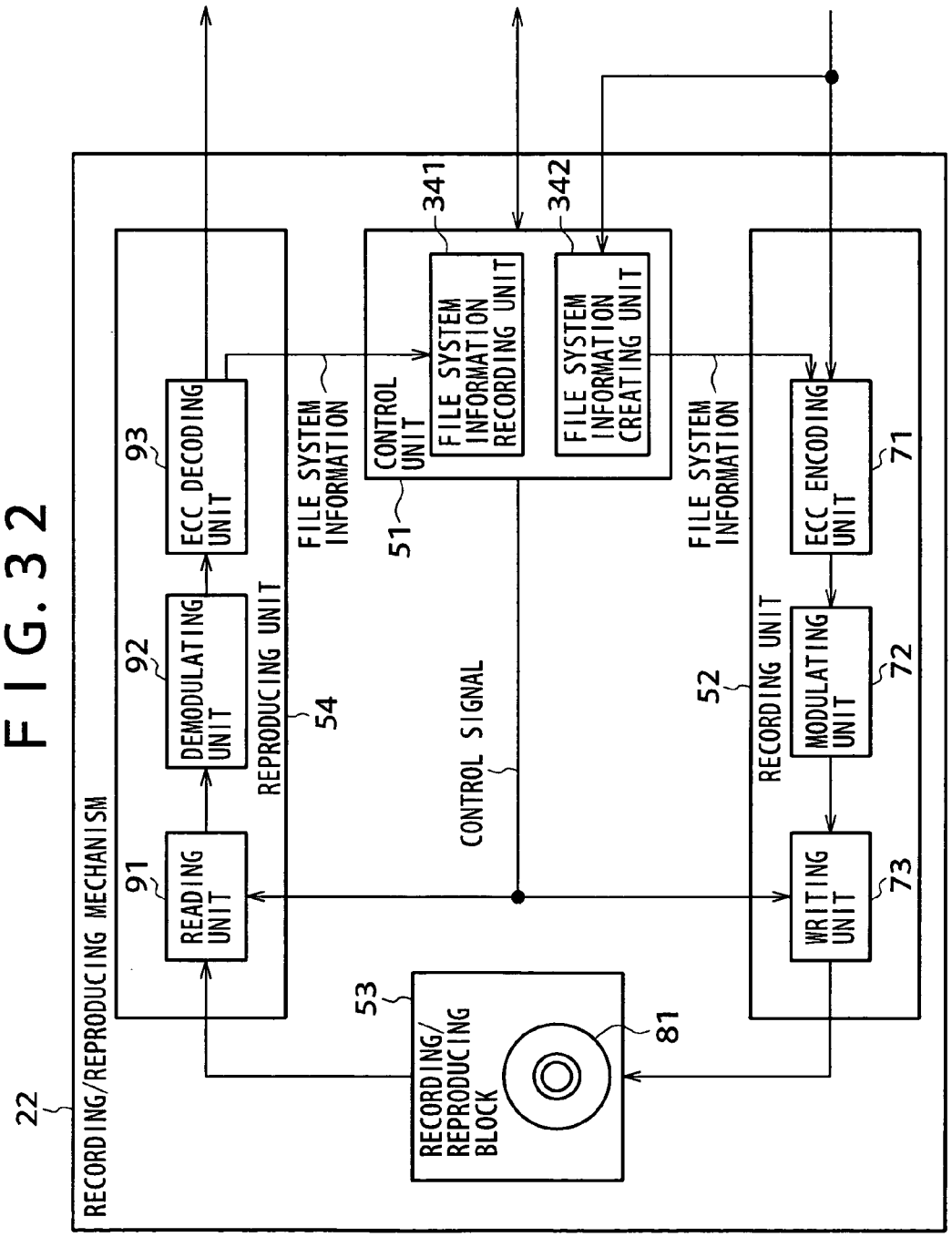
FIG. 32 is a block diagram illustrating yet another typical structure of the recording/reproducing mechanism included in FIG. 1.

FIG. 32 is a block diagram illustrating another typical structure of the recording/reproducing mechanism 22. This type of recording/reproducing mechanism 22 records the gathered information in accordance with the UDF rules. In FIG. 32, those components of the recording/reproducing mechanism 22 with their counterparts already shown in FIG. 2 are given the same reference numerals, and the descriptions of such components are omitted where they are redundant.

What makes the recording/reproducing mechanism 22 in FIG. 32 different from its counterpart in FIG. 2 is that a file system information recognizing unit 341 and a file system information creating unit 342 replace the file system information recognizing unit 61 and file system information creating unit 62, respectively.

The file system information recognizing unit 341 basically has the same capabilities as the file system information recognizing unit 61. What characterizes the file system information recognizing unit 341 is that it controls the reading unit 91 so as to read from "File Structure" of UDF the information that has been recorded by the file system information creating unit 342 and to read files under group management based on the information described in "File Structure."

The file system information creating unit 342 basically has the same capabilities as the file system information creating unit 62. What makes the file system information creating unit 342 different is that it controls the writing unit 73 so as to establish information corresponding to "File Structure" of UDF and to write the established information to the storage medium 81.

Figure 33:
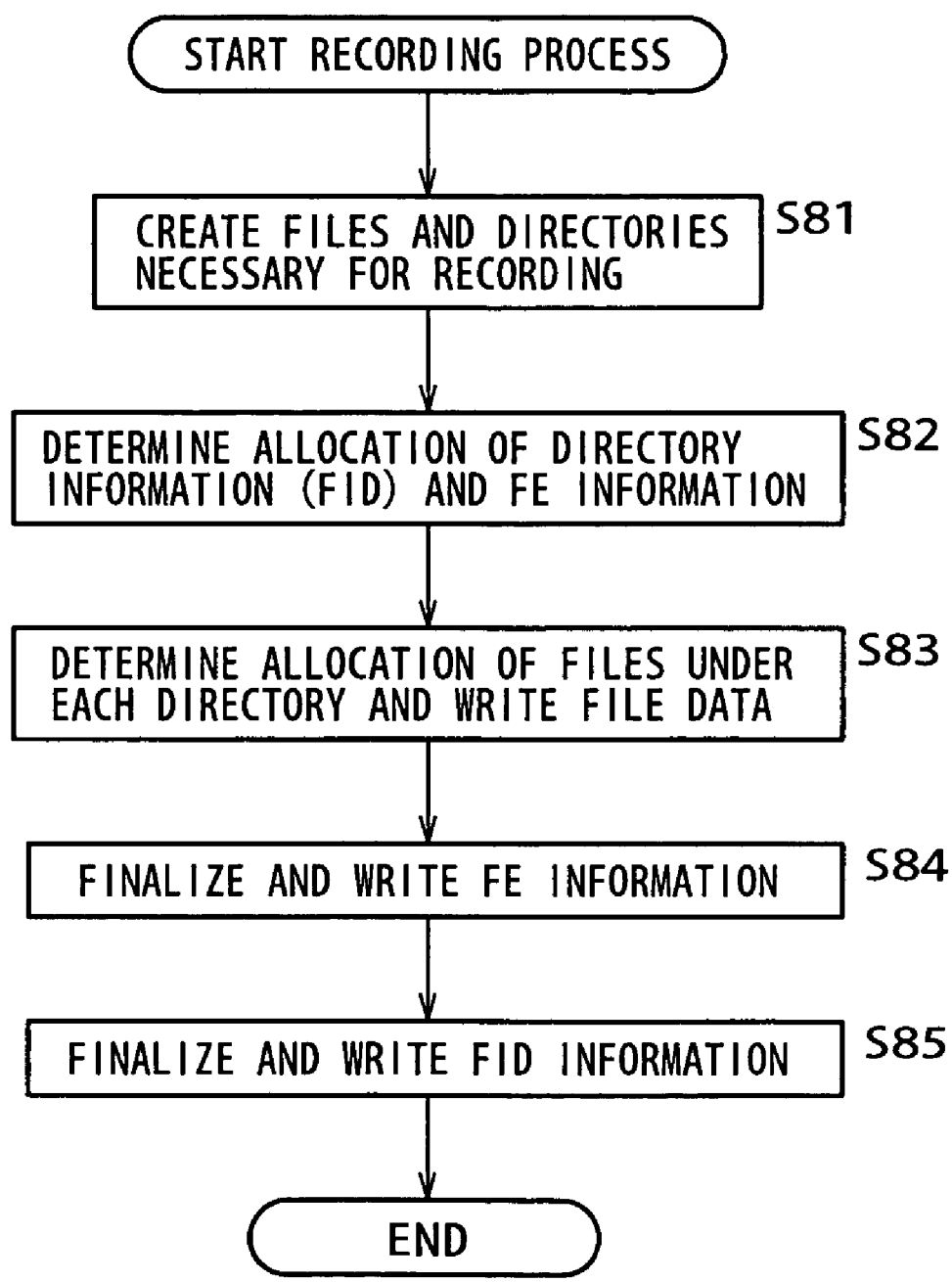
FIG. 33 is a flowchart of steps constituting a recording process performed by the recording/reproducing mechanism in FIG. 32.

Described below with reference to the flowchart of FIG. 33 is a recording process performed by the recording/reproducing mechanism 22 in FIG. 32.

Figure 34:
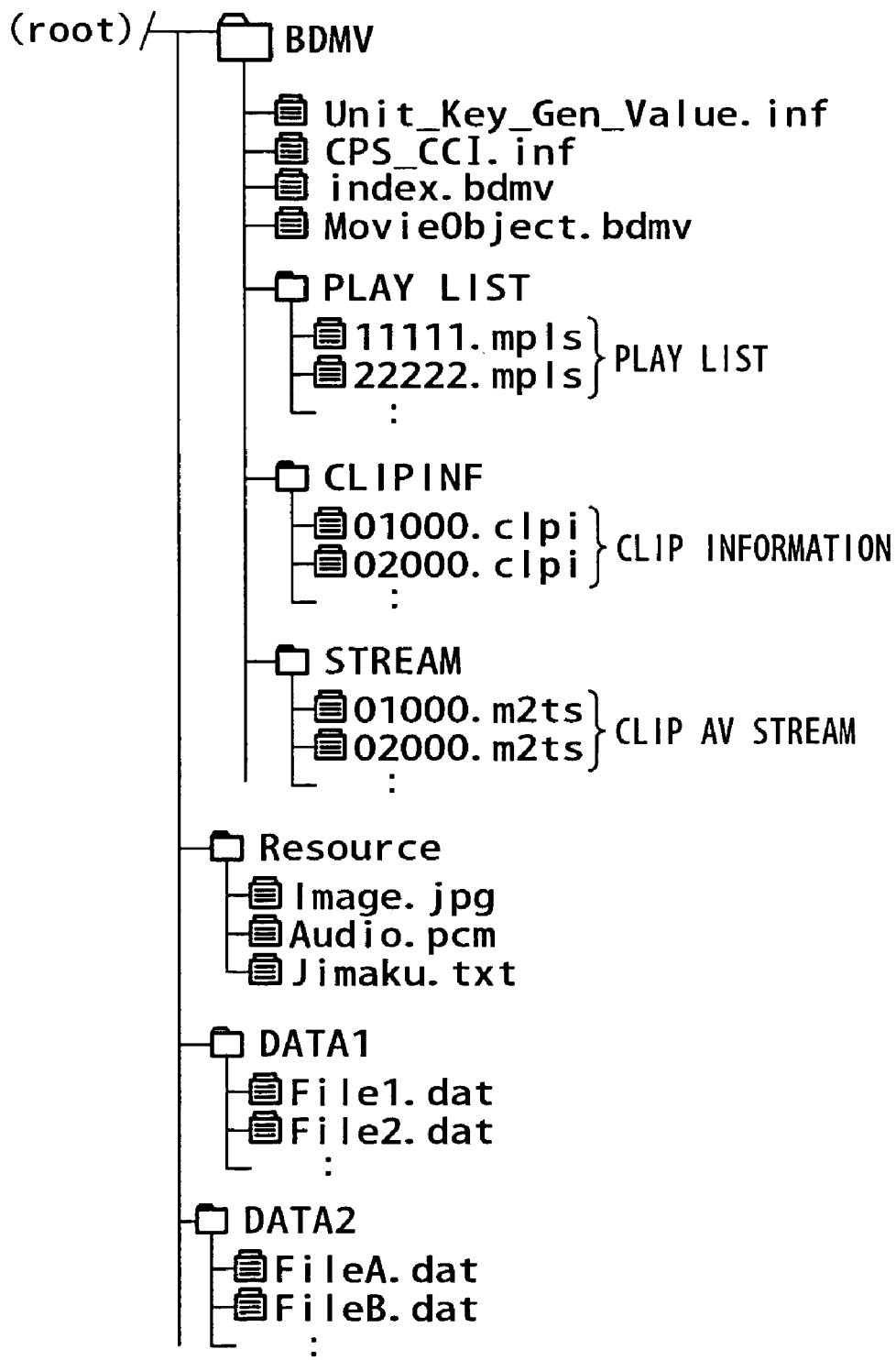
FIG. 34 is an explanatory view of a directory structure for use in the recording process performed by the recording/reproducing mechanism in FIG. 32.

In step S81, the file system information creating unit 342 illustratively creates files and directories (e.g., those corresponding to "File Structure" and "File" of UDF) immediately below the root directory as shown in FIG. 34. More specifically, the file system information creating unit 342 creates, immediately below the root directory, a "BDMV" directory, a "Resource" directory, a "DATA1" directory, etc., along with files subsumed under each of these directories as depicted in FIG. 34. The makeup in FIG. 34 is basically the same as that in FIG. 13 except for the "Gathered.inf" file that has been removed, and is in fact identical to what is shown in FIG. 6. Thus the makeup in FIG. 34 will not be discussed further.

In step S82, the file system information creating unit 342 determines the allocation of FID information (i.e., directory information) and FE information in the memory, not shown.

In step S83, the file system information creating unit 342 controls the writing unit 73 so as to determine the actual allocation of files under each of the directories created on the storage medium 81 and to write file data to the allocated files. At this point, the file system information creating unit 342 records the written files, directory FID's, and FE's successively to the memory, not shown.

One reason why it takes time to read each UDF file is the need to execute as many as three steps: the file identifier descriptor (FID) of the desired file is first recognized, the file entry (FE) of the file is then retrieved based on FID, and the file body is ultimately accessed according to FE. The three steps to be carried out are further compounded by the fact that the recorded locations of FE's and file bodies are not definitively fixed. The file system information creating unit 342 thus determines the file allocation by applying predetermined rules to the method for allocating FE's and file bodies.

More specifically, FE's regarding the files and directories subsumed under each directory are allocated successively in the order of FID's written in the directory information. As with FE's, the file bodies are also allocated consecutively in keeping with the FID allocation order in the directory information. These rules are stipulated not only under each directory but also across a plurality of directories subsumed under the same directory in the case of certain applications.

In step S84, the file system information creating unit 342 controls the writing unit 73 so as to finalize FE information based on the location information about the written files and on the allocation information in the directory information determined in step S82, and to write the finalized FE information to the storage medium 81 as "File Structure" information.

In step S85, the file system information creating unit 342 controls the writing unit 73 so as to finalize FID information based on the FE allocation information finalized in step S82 and to write the finalized FID information to the storage medium 81 as "File Structure" information.

As a result, the structure of the "BDMV" directory in FIG. 34 is described in "File Structure" in an allocation format such as one shown in FIG. 35. In FIG. 35, the leftmost column indicates LBN's, the middle column shows structure elements, and the rightmost column gives descriptors. Illustratively, the area having LBN A accommodates the structure of the "BDMV" directory, with descriptors FID (parent directory), FID (Unit_Key_Gen_Value.inf), FID (CPS_CCI.inf), . . . , FID (PLAYLIST), FID (CLIPINF), and FID (STREAM), allocated from the top down. These descriptors are provided as FID's of the files and directories subsumed immediately under the "BDMV" directory in FIG. 34.

The area having LBN's A+1 through A+7 accommodates the structure of ICB's (information control blocks) for files/directories under the "BDMV" directory, with descriptors FE (Unit_Key_Gen_Value.inf), FE (CPS_CCI.inf), . . . , FE (PLAYLIST), FE (CLIPINF), and FE (STREAM), allocated from the top down, each FE corresponding to the above-described FID's. In other words, the corresponding FID and FE items are allocated in the same order, as shown in FIG. 35.

With the allocation above in effect, verifying the first and the last FID's in the directory information makes it possible to acquire the starting and the end points of an area where FE's are written regarding the files and directories under the same directory.

Figure 36:
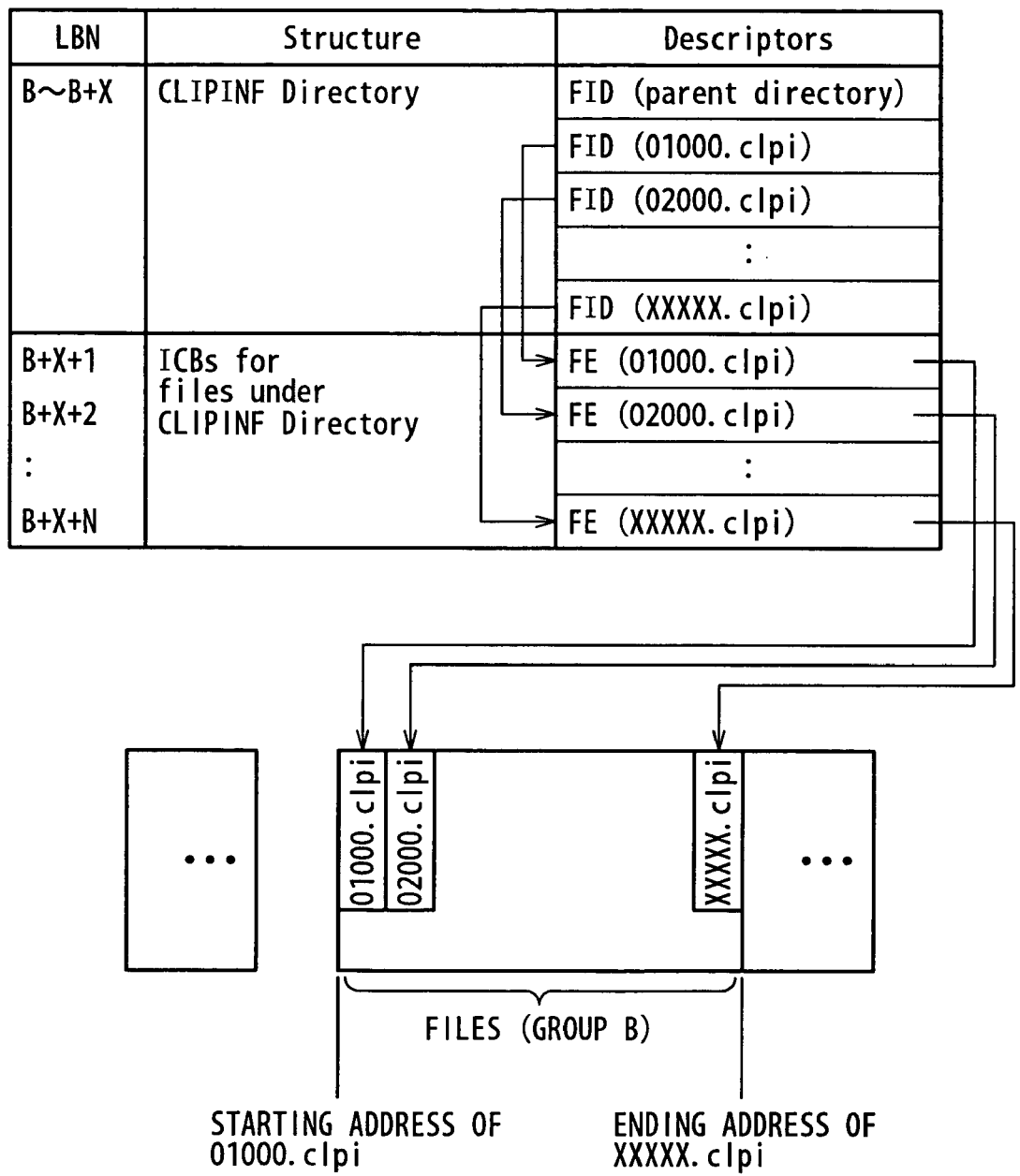
FIG. 36 is another explanatory view of the structure of files recorded in the recording process performed by the recording/reproducing mechanism in FIG. 32.

The other directories are also given similar structures. For example, the "CLIPINF" directory is structured as illustrated in FIG. 36. The area having LBN's B through B+X describes the structure of the "CLIPINF" directory, with descriptors FID (parent directory), FID (01000.clpi), FID (02000.clpi), . . . , FID (XXXXX.clpi) arranged from the top down. These descriptors denote FID's of the files or directories recorded immediately below the "CLIPINF" directory in FIG. 34.

The area having LBN's B+X+1 through B+X+N accommodates the structure of ICB's (information control blocks) for files under the "CLIPINF" directory, with descriptors FE (01000.clpi), FE (02000.clpi), . . . , FE (XXXXX.clpi), allocated from the top down, each FE corresponding to the above-described FID's. In other words, the corresponding FID and FE items are allocated in the same order in FIG. 36 as well.

With the allocation above in effect, the starting FID is first read out followed by the starting FE. The starting location of the first file body is verified, with the ending FID read out at the same time, whereby the ending FE is retrieved. Thereafter the ending location of the last file body is verified. This permits acquisition of the starting and the ending addresses of the area in which the files under a particular directory are stored. The acquired addresses allow the target data to be obtained in a single read pass.

Figure 37:
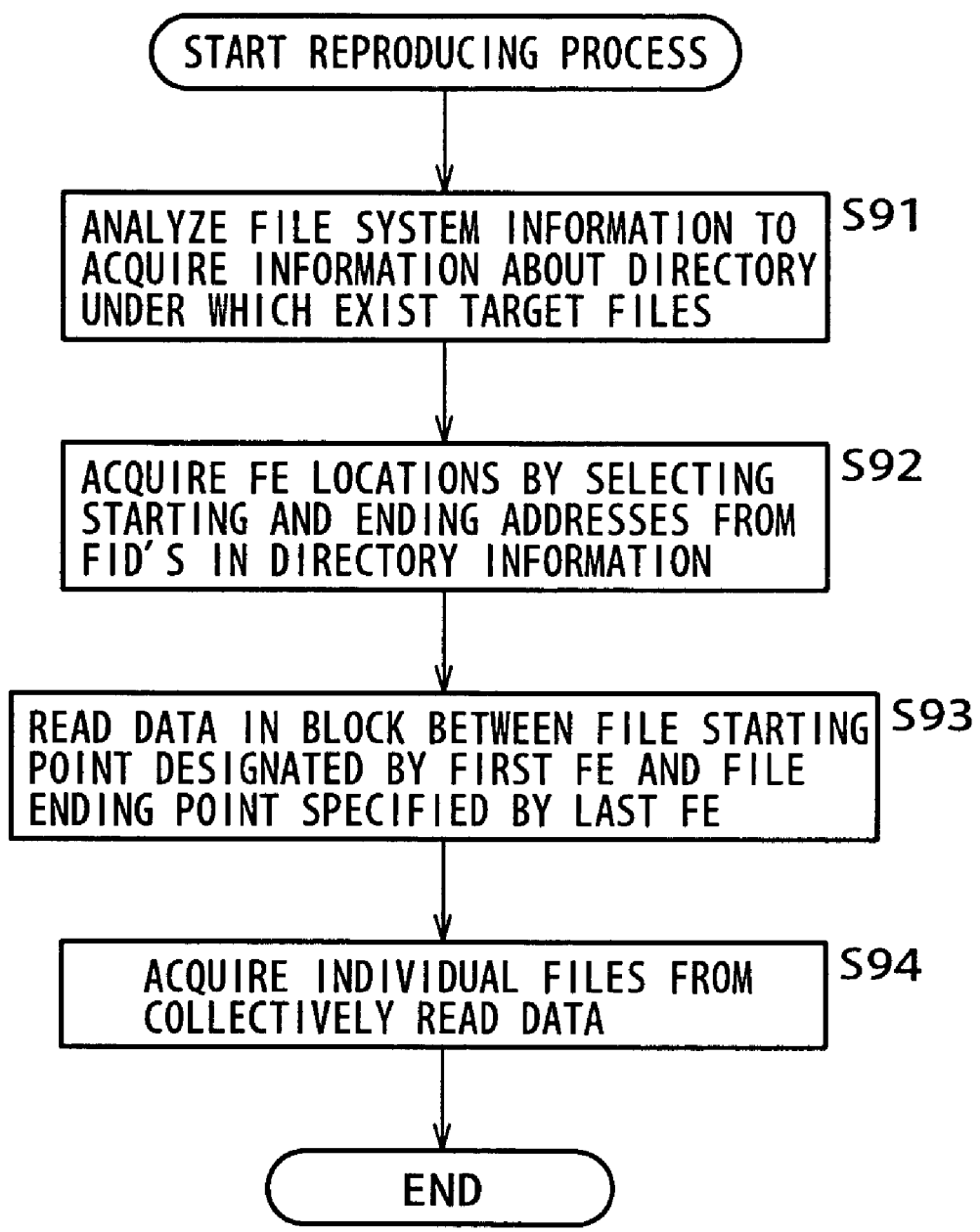
FIG. 37 is a flowchart of steps constituting a reproducing process performed by the recording/reproducing mechanism in FIG. 32.

Described below with reference to the flowchart of FIG. 37 is a reproducing process performed by the recording/reproducing mechanism 22 in FIG. 28.

In step S91, the file system information recognizing unit 341 controls the reading unit 91 so as to have the recording/reproducing block 53 analyzing the file system information recorded on the storage medium 81, thereby acquiring information about the directory under which the target files exist.

In step S92, the file system information recognizing unit 341 acquires the locations of FE'S indicated by the starting and the ending addresses of FID's in the directory information obtained in step S91.

In step S93, the file system information recognizing unit 341 causes the recording/reproducing block 53 collectively to read information between the file starting point designated by the starting FE and the file end point specified by the ending FE (or, between the directory starting point designated by the starting FE and the directory end point specified by the ending FE).

In step S94, the file system information recognizing unit 341 acquires individually the target files from the data that was read collectively in step S93. That is, the file system information recognizing unit 341 acquires the target files individually from the collectively retrieved files in accordance with the file system information.

Illustratively, suppose that files are allocated continuously under the directories such as "BDMV" shown in FIG. 35, "PLAYLIST" and "CLIPINF," and that the starting FE (Unit_Key_Gen_Value.inf) under the "BDMV" directory is the starting point and the ending file (XXXXX.clpi) under the "CLIPINF" directory is the end point as shown in FIG. 36. In that case, the process above reads information collectively between the starting and the end points, thereby reading in a single pass the files held under these three directories. This provides high-speed data retrieval.

More specifically, the starting FID is first read, followed by the starting FE. The starting location of the first file body is then verified while the ending FID is read out at the same time. Accordingly the ending FE is read out, and the ending location of the last file body is ascertained. With the starting and the ending locations of the file bodies thus acquired, it is possible to obtain the starting and the ending addresses of the area in which the target files are stored under the directories and thereby to acquire the target data collectively in a single read pass. These rules may be applied not only within the directories but also across a plurality of directories under the same directory regarding particular applications. This permits acquisition of the starting and the ending addresses of the entire management data merely through a partial analysis of the file structure. As a result, the speed of data retrieval is enhanced appreciably.

In the foregoing explanation of the rules of allocation particularly in reference to FIG. 14, the use of single-layer disks was assumed for the implementation of the invention. Alternatively, similar allocation rules may be established for multi-layer disks as well.

Figure 38:
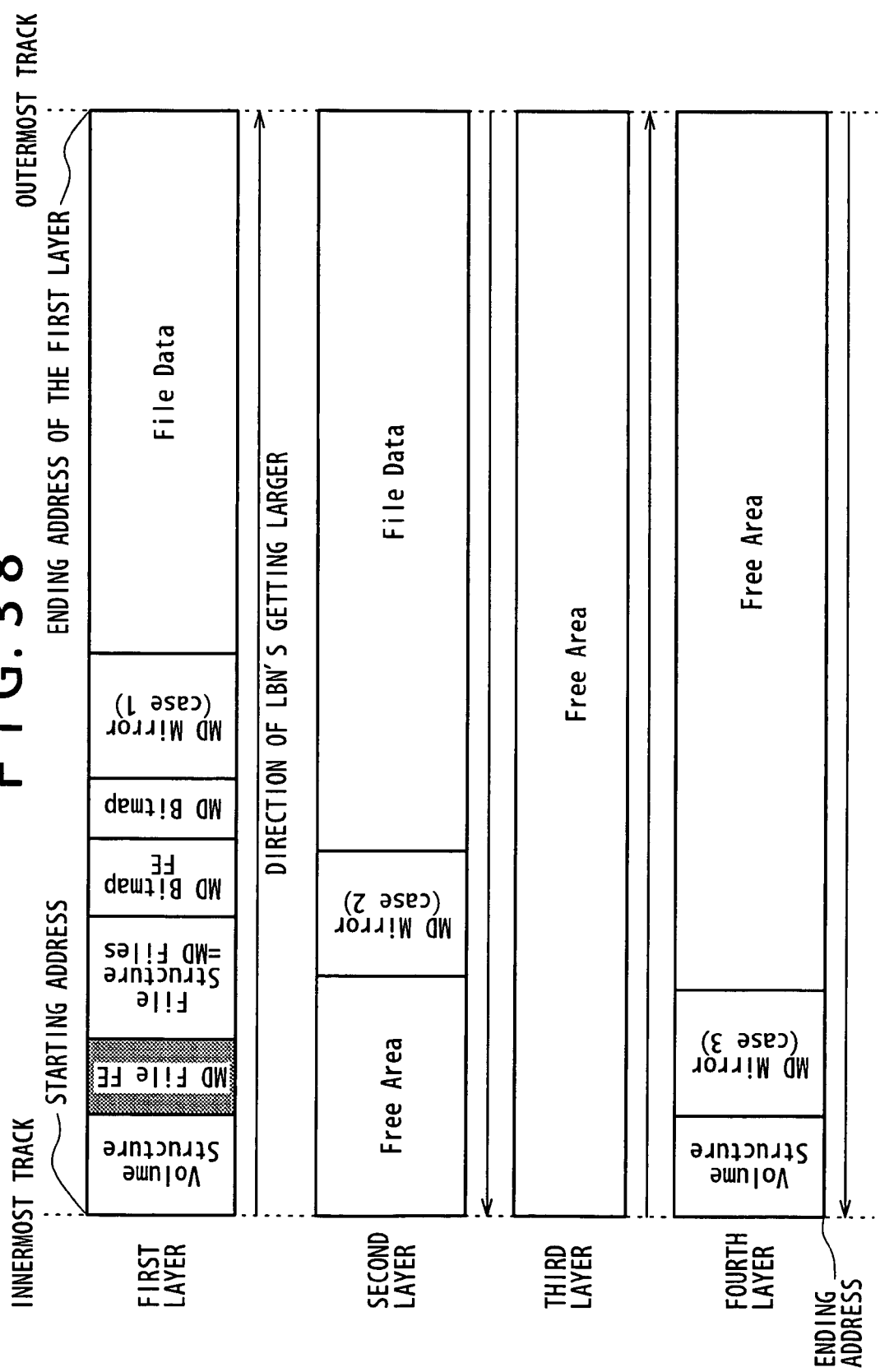
FIG. 38 is an explanatory view of typical data allocation applicable to another type of the storage medium as part of the setup in FIG. 2.

Illustratively, FIG. 38 shows an example in which what is called meta data partition is utilized. This invention may also be applied to multi-layer media where the meta data partition is not used.

FIG. 38 depicts the rules that apply where a first through a fourth layer are allocated from the top down. In the first and the third layers, LBN's are allocated in a manner getting larger toward the outermost track of the disk; LBN's allocated in the second and the four layers grow larger toward the innermost track. The first through the fourth layers are established consecutively along with their areas.

In the first layer, "Volume Structure," "MD File FE," "File Structure," "MD Bitmap FE," "MD Bitmap," "MD Mirror (Case 1)" and "File Data" are recorded in that order in the direction of LBN's getting larger. In the second layer, "File Data," "MD Mirror (Case 2)" and "Free Area" are recorded in that order in the direction of LBN's becoming larger. The third layer accommodates "Free Area," and the fourth layer has "Free Area," "MD Mirror (Case 3)" and "Volume Structure" recorded therein in that order in the direction of LBN's getting larger.

"MD Mirror" is designed to record meta files ("File Structure") in duplicate. One of three cases (1 through 3, as shown) is conceivable as the location in which to record "MD Mirror" (i.e., "MD Mirror" is recorded in one of the first, the second, and the fourth layers). Meta data bitmap files are designed to define the used and unused areas within the meta files. However, the bitmap files are not needed if the storage medium 81 is a ROM. In this case, "MD Bitmap FE" and "MD Bitmap" in FIG. 38 are unnecessary.

With a multi-layer ROM medium, the quantity of the data recorded thereon is finalized at the time of disk production. In the case of a two-layer disk shown in FIG. 39, half of the data is recorded in the first layer and the other half in the second layer, with logical sectors and logical blocks allocated only to the data-recorded areas.

Figure 39:
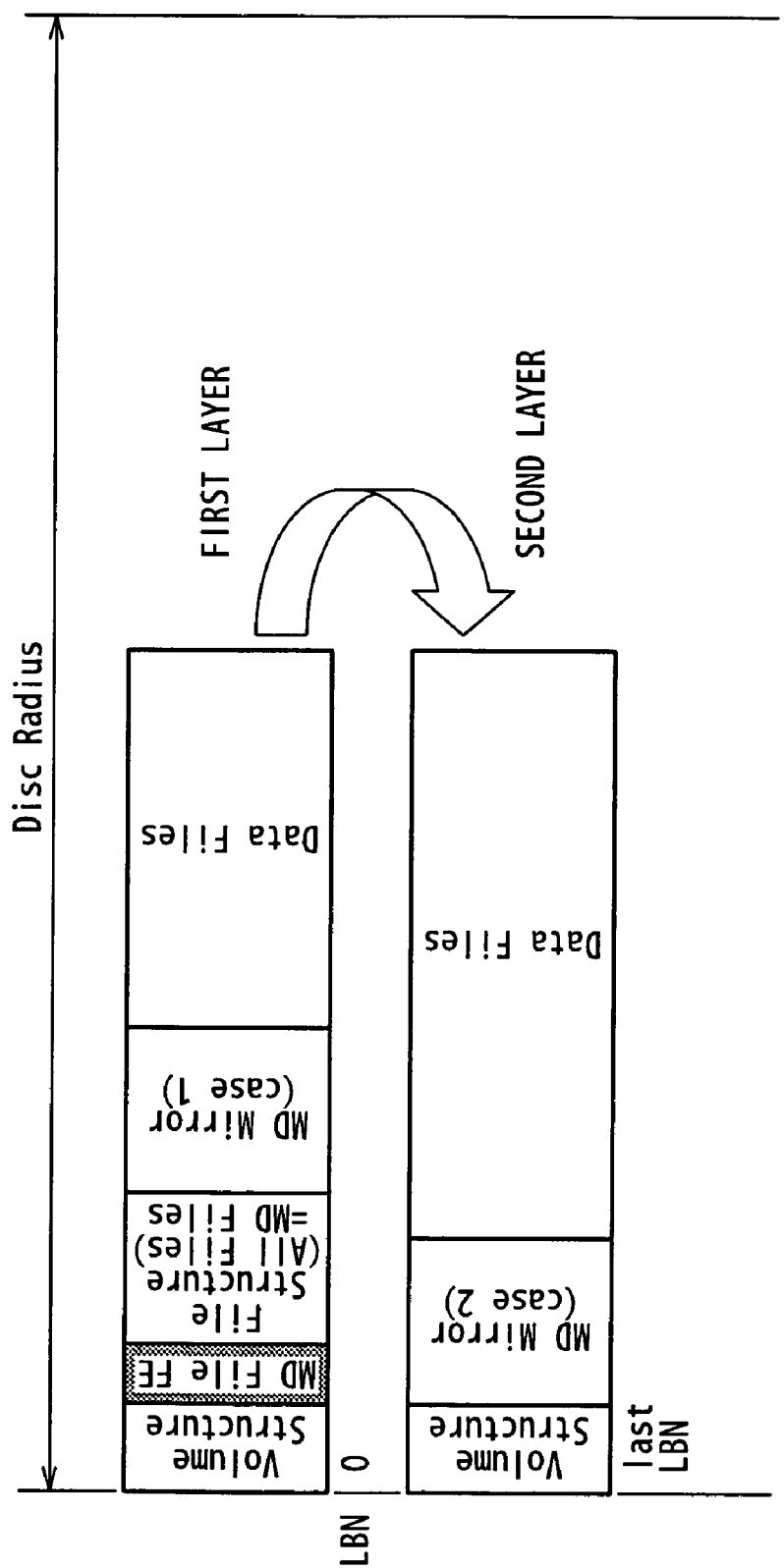
FIG. 39 is an explanatory view of typical data allocation applicable to yet another type of the storage medium as part of the setup in FIG. 2.

In the example of FIG. 39, the first layer has "Volume Structure," "MD File FE," "File Structure," "MD Bitmap FE," "MD Bitmap," "MD Mirror (Case 1)," and "File Data" recorded therein in that order in the direction of LBN's getting larger. The second layer has "File Data," "MD Mirror (Case 2)," "Free Area," and "Volume Structure" recorded therein in that order in the direction of LBN's becoming smaller." As with the example in FIG. 38, one of two cases (1 and 2 as shown) is conceivable as the location in which to record "MD Mirror" (i.e., "MD Mirror" is recorded in either the first or the second layer).

In any case, the inventive arrangements above allow files managed in groups and recorded on the storage medium to be read out (i.e., reproduced) at a significantly high speed.

The series of steps or processes described above may be executed either by hardware or by software. For the software-based processing to take place, the programs constituting the software may be either incorporated beforehand in dedicated hardware of a computer or installed upon use from a suitable program storage medium into a general-purpose personal computer or like equipment capable of executing diverse functions based on the installed programs.

As shown in FIG. 1, the program storage medium is offered to users apart from the recording/reproducing apparatus 1 not only as a package medium constituted by the magnetic disk 41 (including flexible disks), optical disk 42 (including CD-ROM (compact disc-read only memory) and DVD (digital versatile disk)), magneto-optical disk 43 (including MD (Mini-disc)), or semiconductor memory 44, each medium carrying the necessary programs; but also in the form of the ROM 12 or the hard disk drive in the storage unit 18, both accommodating the programs and incorporated beforehand in the recording/reproducing apparatus 1.

In this specification, the steps which are stored on the program storage medium and which describe the programs to be executed represent not only the processes that are carried out in the depicted sequence (i.e., on a time series basis) but also processes that may be performed parallelly or individually.

In this specification, the term "system" refers to an entire configuration made up of a plurality of component devices.

As many apparently different embodiments of this invention may be made without departing from the spirit and scope thereof, it is to be understood that the invention is not limited to the specific embodiments thereof except as defined in the appended claims.

What is claimed is:

1. An information recording apparatus comprising:
a recording section configured to record files to a storage medium according to a Universal Disc Format (UDF) that includes files in group management and files not in group management;
an arranging section configured to allocate each of said files in group management into one of predetermined groups based on an attribute of each of said files in group management so as to establish an allocation of said files in group management on said storage medium, wherein the arranging section is further configured to allocate each of said files in group management into one of the predetermined groups based on a frequency of use or update of said files, and a maximum total size of files constituting a group, and the files not in group management are not allocated to any of the predetermined groups and include AV stream files; and
a controlling section configured to control said recording section so as to set up a first partition and a second partition on said storage medium, the first partition corresponding to a first portion of the storage medium and the second partition corresponding to a second portion of the storage medium, record to the first partition each of said files in group management including the attribute corresponding to the one of the predetermined groups and allocated to the corresponding one of the predetermined groups, and record to the second partition each of said files not in group management, and to record concurrently allocation information reflecting said allocation to a predetermined location on said storage medium.

2. The apparatus according to claim 1, wherein said controlling section controls said recording section so as to record said files to said storage medium based on said allocation established by said arranging section and to record concurrently said allocation information reflecting said allocation to a user data area on said storage medium.

3. The apparatus according to claim 1, wherein said controlling section controls said recording section so as to record said files to said storage medium based on said allocation established by said arranging section and to record concurrently said allocation information reflecting said allocation to a fixed address in a user data area on said storage medium.

4. The apparatus according to claim 1, wherein said controlling section controls said recording section so as to record said files to said storage medium based on said allocation established by said arranging section and to record concurrently said allocation information reflecting said allocation to a physical area on said storage medium.

5. The apparatus according to claim 1, wherein said controlling section controls said recording section to perform said recording group by group based on said allocation established by said arranging section.

6. The apparatus according to claim 1, wherein said files are managed in the Universal Disc Format.

7. The apparatus of claim 1, wherein the first partition corresponds to a first physical portion of the storage medium and the second partition corresponds to a second physical portion of the storage medium.

8. An information recording method comprising the steps of:
recording files to a storage medium according to a Universal Disc Format (UDF) that includes files in group management and files not in group management;
arranging each of said files in group management into one of predetermined groups based on an attribute of each of said files in group management so as to establish an allocation of said files in group management on said storage medium, wherein the arranging includes allocating each of said files in group management into one of the predetermined groups based on a frequency of use or update of said files, and a maximum total size of files constituting a group, and the files not in group management are not allocated to any of the predetermined groups and include AV stream files;
setting up a first partition and a second partition on said storage medium, the first partition corresponding to a first portion of the storage medium and the second partition corresponding to a second portion of the storage medium; and
controlling said recording step so as to record to the first partition each of said files in group management including the attribute corresponding to the one of the predetermined groups and allocated to the corresponding one of the predetermined groups, record to the second partition each of said files not in group management, and to record concurrently allocation information reflecting said allocation to a predetermined location on said storage medium.

9. The method of claim 8, wherein the first partition corresponds to a first physical portion of the storage medium and the second partition corresponds to a second physical portion of the storage medium.

10. A computer-readable medium storing a computer program which when executed by the computer causes the computer to perform steps comprising:

recording files to a storage medium according to a Universal Disc Format (UDF) that includes files in group management and files not in group management;

arranging each of plural files in group management into one of predetermined groups based on an attribute of each of said files in group management so as to establish an allocation of said files in group management on said storage medium, wherein the arranging includes allocating each of said files in group management into one of the predetermined groups based on a frequency of use or update of said files, and a maximum total size of files constituting a group, and the files not in group management are not allocated to any of the predetermined groups and include AV stream files;

setting up a first partition and a second partition on said storage medium, the first partition corresponding to a first portion of the storage medium and the second partition corresponding to a second portion of the storage medium; and controlling, the recording step so as to record to the first partition of each of said files in group management including the attribute corresponding to the one of the predetermined groups and allocated to the corresponding one of the predetermined groups, recording to the second partition each of said files not in group management, and recording concurrently allocation information reflecting said allocation to a predetermined location on said storage medium.

11. The computer-readable storage medium of claim 10, wherein the first partition corresponds to a first physical portion of the storage medium and the second partition corresponds to a second physical portion of the storage medium.

12. An information recording apparatus comprising:

a recording section configured to record files to a storage medium according to a Universal Disc Format (UDF) that includes files in group management and files not in group management;

an arranging section configured to allocate each of said files in group management into one of predetermined groups based on an attribute of each of said files in group management so as to establish an allocation of said files in group management in a predetermined sequence in each of said groups, wherein the arranging section is further configured to allocate each of said files in group management into one of the predetermined groups based on a frequency of use or update of said files, and a maximum total size of files constituting a group, and the files not in group management are not allocated to any of the predetermined groups and include AV stream files; and a controlling section configured to set up a first partition and a second partition on said storage medium, the first partition corresponding to a first portion of the storage medium and the second partition corresponding to a second portion of the storage medium, and control said recording section so as to record to the first partition each of said files in group management including the attribute corresponding to the one of the predetermined groups and allocated to the corresponding one of the predetermined groups, and record to the second partition each of said files not in group management.

13. The apparatus according to claim 12, wherein said files are managed in the Universal Disc Format.

14. The apparatus of claim 12, wherein the first partition corresponds to a first physical portion of the storage medium and the second partition corresponds to a second physical portion of the storage medium.

15. An information recording method comprising the steps of:

recording files to a storage medium according to a Universal Disc Format (UDF) that includes files in group management and files not in group management;

arranging each of the files in group management into one of predetermined groups based on an attribute of each of said files in group management so as to establish an allocation of said files in group management in a predetermined sequence in each of said groups, wherein the arranging includes allocating each of said files in group management into one of the predetermined groups based on a frequency of use or update of said files, and a maximum total size of files constituting a group, and the files not in group management are not allocated to any of the predetermined groups and include AV steam files;

setting up a first partition and a second partition on said storage medium, the first partition corresponding to a first portion of the storage medium and the second partition corresponding to a second portion of the storage medium; and controlling said recording step so as to record to the first partition each of said files in group management including the attribute corresponding to the one of the predetermined groups and allocated to the corresponding one of the predetermined groups, and record to the second partition each of said files not in group management.

16. The method of claim 15, wherein the first partition corresponds to a first physical portion of the storage medium and the second partition corresponds to a second physical portion of the storage medium.

17. A computer-readable medium storing a computer program which when executed by the computer causes the computer to perform steps comprising:

recording files to a storage medium according to a Universal Disc Format (UDF) that includes files in group management and files not in group management;

arranging each of plural files into one of predetermined groups based on an attribute of each of said files in group management so as to establish an allocation of said files in group management in a predetermined sequence in each of said groups, wherein the arranging includes allocating each of said files in group management into one of the predetermined groups based on a frequency of use or update of said files, and a maximum total size of files constituting a group, and the files not in group management are not allocated to any of the predetermined groups and include AV stream files;

setting up a first partition and a second partition on said storage medium, the first partition corresponding to a first portion of the storage medium and the second partition corresponding to a second portion of the storage medium; and exerting control to record to the first partition each of said files in group management including the attribute corresponding to the one of the predetermined groups and allocated to the corresponding one of the predetermined groups, and record to the second partition each of said files not in group management.

18. The computer-readable storage medium of claim 17, wherein the first partition corresponds to a first physical portion of the storage medium and the second partition corresponds to a second physical portion of the storage medium.

* * * * *